US009693216B2

(12) United States Patent
Deng et al.

(10) Patent No.: US 9,693,216 B2
(45) Date of Patent: Jun. 27, 2017

(54) UPLINK DETECTION-BASED PROCESSING METHOD, NETWORK DEVICE, AND TERMINAL

(71) Applicant: Huawei Technologies Co., Ltd., Shenzhen, Guangdong (CN)

(72) Inventors: Tianle Deng, Shanghai (CN); Xiao Chen, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 73 days.

(21) Appl. No.: 14/670,963

(22) Filed: Mar. 27, 2015

(65) Prior Publication Data

US 2015/0201319 A1   Jul. 16, 2015

Related U.S. Application Data

(63) Continuation of application No. PCT/CN2012/082376, filed on Sep. 28, 2012.

(51) Int. Cl.
| | | |
|---|---|---|
| *H04W 72/00* | (2009.01) | |
| *H04W 8/00* | (2009.01) | |
| *H04W 48/16* | (2009.01) | |
| *H04W 48/08* | (2009.01) | |
| *H04W 52/02* | (2009.01) | |
| *H04W 72/04* | (2009.01) | |
| *H04B 17/382* | (2015.01) | |

(52) U.S. Cl.
CPC ........... *H04W 8/005* (2013.01); *H04W 48/08* (2013.01); *H04W 48/16* (2013.01); *H04W 52/0206* (2013.01); *H04W 72/0413* (2013.01); *H04B 17/382* (2015.01)

(58) Field of Classification Search
CPC ..... H04W 8/183; H04W 36/30; H04W 24/00; H04W 28/08; H04W 52/24; H04W 80/04; H04M 1/72511; H04L 2012/5607
USPC .......... 455/432.1, 436, 452.1, 0.2, 453, 464, 455/522; 370/310.2, 318, 328
See application file for complete search history.

(56) References Cited

U.S. PATENT DOCUMENTS

| | | | |
|---|---|---|---|
| 2011/0244866 A1 | 10/2011 | Yamamoto | |
| 2012/0051260 A1 | 3/2012 | Tamaki | |
| 2012/0276909 A1 | 11/2012 | Xiao et al. | |
| 2013/0310041 A1 | 11/2013 | Deng et al. | |

FOREIGN PATENT DOCUMENTS

| | | |
|---|---|---|
| CN | 102123478 A | 7/2011 |
| CN | 102209350 A | 10/2011 |
| CN | 102625388 A | 8/2012 |
| EP | 2 563 073 A1 | 2/2013 |
| EP | 2 670 194 A1 | 12/2013 |
| WO | WO 2012/089082 A1 | 7/2012 |
| WO | WO 2012/100746 A1 | 8/2012 |

*Primary Examiner* — Steve D Agosta
(74) *Attorney, Agent, or Firm* — Oblon, McClelland, Maier & Neustadt, L.L.P.

(57) ABSTRACT

The present application provides an uplink detection-based processing method, a network device, and a terminal. The method includes: acquiring first information; acquiring receive power information that is used by a first access device to receive a radio signal sent by a terminal; and performing processing according to the first information and the receive power information that is used by the first access device to receive the radio signal sent by the terminal. Embodiments of the present application can implement uplink detection-based processing.

16 Claims, 10 Drawing Sheets

UPLINK DETECTION-BASED PROCESSING METHOD, NETWORK DEVICE, AND TERMINAL

CROSS-REFERENCE TO RELATED APPLICATIONS

This application is a continuation of International Application No. PCT/CN2012/082376, filed on Sep. 28, 2012, which is hereby incorporated by reference in its entirety.

TECHNICAL FIELD

The present application relates to wireless communications technologies, and in particular, to an uplink detection-based processing method, a network device, and a terminal.

BACKGROUND

A heterogeneous network (HetNet) includes different wireless networks, such as a macro cell, a pico cell, and a femto cell. Transmit power and coverage of different base stations are different. Transmit power and coverage of a high-power base station (for example, a macro base station) are relatively large, and transmit power and coverage of a low-power base station (for example, a Femto base station and a Pico base station) are relatively small. A typical HetNet scenario is that multiple low-power base stations provide hotspot coverage within coverage of a single high-power base station.

In a type of energy saving (ES) case of a self-organizing network (SON), a low-power base station used for hotspot coverage is shut down for energy saving when there is no high-speed data service (for example, at night), and basic coverage and basic service support are provided by a macro base station. As load in a macro cell increases, an appropriate low-power base station needs to be awakened on a network side to provide a service for a user equipment (UE) in coverage of the low-power base station, so as to reduce the load in the macro cell. Alternatively, in a cell selection solution supporting uplink-downlink separation, a UE needs to access a base station according to an optimal channel condition in the uplink and downlink, for example, the UE accesses a macro base station in the downlink, and accesses a low-power base station in the uplink. In the foregoing scenarios, the low-power base station needs to identify whether UEs originally served by a macro base station (these UEs may be referred to as MUEs) fall within coverage of the low-power base station.

In the prior art, a low-power base station can identify an MUE and an interference status of the MUE by actively listening to uplink transmission of the MUE; however, according to the interference status only, it cannot be accurately determined whether the MUE falls within coverage of the low-power base station. For example, a receive power of an MUE outside the coverage of the low-power base station may be relatively high possibly due to a relatively transmit power of the MUE when the low-power base station performs receiving, and if according to the interference status, it may be incorrectly determined that the MUE falls within the coverage.

SUMMARY

In view of this, embodiments of the present application provide an uplink detection-based processing method, a network device, and a terminal, which are used to implement uplink detection-based processing, and can further provide a basis for a low-power base station to identify an MUE in coverage of the low-power base station.

According to a first aspect, an uplink detection-based processing method is provided, including, acquiring, by a network device, first information, where the first information is transmit power information that a terminal uses when sending a radio signal; or the first information includes receive power information that is used by a second access device to receive the radio signal sent by the terminal and information about path loss from the second access device to the terminal; or the first information includes receive power information that is used by a second access device to receive the radio signal sent by the terminal, transmit power information of the second access device, and measurement information for the second access device obtained by the terminal;

acquiring, by the network device, receive power information that is used by the first access device to receive the radio signal sent by the terminal; and performing, by the network device, processing according to the first information and the receive power information that is used by the first access device to receive the radio signal sent by the terminal, where the network device is the first access device, the second access device, or a network entity, the network entity is a network device different from the first access device and the second access device, and the second access device is an access device that currently serves the terminal.

With reference to the first aspect, in a first possible implementation manner of the first aspect, the performing, by the network device, processing according to the first information and the receive power information that is used by the first access device to receive the radio signal sent by the terminal includes:

determining, by the network device according to the first information and the receive power information that is used by the first access device to receive the radio signal sent by the terminal, whether the terminal can be served by the first access device.

With reference to the first aspect, in a second possible implementation manner of the first aspect, the method further includes:

acquiring, by the network device, interference power information, where the interference power information is interference power information received by the first access device or interference power information that is received by the terminal and reported by the terminal; and the performing, by the network device, processing according to the first information and the receive power information that is used by the first access device to receive the radio signal sent by the terminal includes:

determining, by the network device according to the first information, the receive power information that is used by the first access device to receive the radio signal sent by the terminal, and the interference power information, whether the terminal can be served by the first access device.

With reference to the first possible implementation manner of the first aspect, in a third possible implementation manner of the first aspect, the determining, by the network device according to the first information, the receive power information that is used by the first access device to receive the radio signal sent by the terminal, whether the terminal can be served by the first access device includes:

determining, by the network device, path loss between the terminal and the first access device according to the first information and the receive power information that is used by the first access device to receive the radio signal sent by the terminal, and determining, according to the path loss between the terminal and the first access device, whether the terminal can be served by the first access device.

With reference to the second possible implementation manner of the first aspect, in a fourth possible implementation manner of the first aspect, the determining, by the network device according to the first information, the receive power information that is used by the first access device to receive the radio signal sent by the terminal, and the interference power information, whether the terminal can be served by the first access device includes:

when the interference power information is the interference power information received by the first access device, determining, by the network device, signal quality according to the first information, the receive power information that is used by the first access device to receive the radio signal sent by the terminal, the interference power information received by the first access device, and transmit power information, which is used when the terminal is served by the first access device, of the terminal, and determining, according to the signal quality, whether the terminal can be served by the first access device; or determining, by the network device, path loss between the terminal and the first access device according to the first information and the receive power information that is used by the first access device to receive the radio signal sent by the terminal; determining, by the network device, signal quality according to the first information, the receive power information that is used by the first access device to receive the radio signal sent by the terminal, the interference power information received by the first access device, and transmit power information, which is used when the terminal is served by the first access device, of the terminal; and determining, according to the path loss between the terminal and the first access device, and the signal quality, whether the terminal can be served by the first access device; or when the interference power information is the interference power information received by the terminal, determining, by the network device, signal quality according to the first information, the receive power information that is used by the first access device to receive the radio signal sent by the terminal, the interference power information received by the terminal, and transmit power information, which is used when the terminal is served by the first access device, of the first access device, and determining, according to the signal quality, whether the terminal can be served by the first access device; or determining, by the network device, path loss between the terminal and the first access device according to the first information and the receive power information that is used by the first access device to receive the radio signal sent by the terminal; determining, by the network device, signal quality according to the first information, the receive power information that is used by the first access device to receive the radio signal sent by the terminal, the interference power information received by the terminal, and transmit power information, which is used when the terminal is served by the first access device, of the first access device; and determining, according to the path loss between the terminal and the first access device, and the signal quality, whether the terminal can be served by the first access device.

With reference to the first aspect, in a fifth possible implementation manner of the first aspect, the performing, by the network device, processing according to the first information and the receive power information that is used by the first access device to receive the radio signal sent by the terminal includes:

starting, by the network device, a transmitter of the first access device according to the first information and the receive power information that is used by the first access device to receive the radio signal sent by the terminal; or determining, by the network device, path loss between the terminal and the first access device according to the first information and the receive power information that is used by the first access device to receive the radio signal sent by the terminal.

With reference to the first aspect or any one of the first to the fifth possible implementation manners of the first aspect, in a sixth possible implementation manner of the first aspect, the first information is the transmit power information that the terminal uses when sending the radio signal, and the acquiring first information includes:

when the network device is the second access device, receiving, by the second access device, the transmit power information that is sent by the terminal and the terminal uses when sending the radio signal; or receiving, by the second access device, the measurement information reported by the terminal, and determining, according to the transmit power information of the second access device, the receive power information that is used by the second access device to receive the radio signal sent by the terminal, and the measurement information, the transmit power information that the terminal uses when sending the radio signal; or determining, by the second access device, the transmit power information that the terminal uses when sending the radio signal, where the transmit power information that the terminal uses when sending the radio signal is configured by the second access device for the terminal or predetermined by the second access device and the terminal; or when the network device is the first access device or the network entity, receiving, by the first access device or the network entity, the first information sent by the second access device.

With reference to the first aspect or any one of the first to the fifth possible implementation manners of the first aspect, in a seventh possible implementation manner of the first aspect, the first information includes the receive power information that is used by the second access device to receive the radio signal sent by the terminal, and the information about the path loss from the second access device to the terminal, or the first information includes the receive power information that is used by the second access device to receive the radio signal sent by the terminal, the transmit power information of the second access device, and the measurement information for the second access device obtained by the terminal, and the acquiring first information includes:

when the network device is the second access device, acquiring, by the second access device, the receive power information that is used by the second access device to receive the radio signal sent by the terminal, acquiring, by the second access device, the measurement information reported by the terminal, and acquiring, by the second access device, the transmit power information of the second access device; or acquiring, by the second access device, the receive power information that is used by the second access device to receive the radio signal sent by the terminal, and acquiring, by the second access device, the information about the path loss from the second access device to the terminal; and when the network device is the first access device or the network entity, receiving, by the first access device or the network entity, the first information sent by the second access device.

With reference to the first aspect or any one of the first to the fifth possible implementation manners of the first aspect, in an eighth possible implementation manner of the first aspect, the first information is the transmit power information that the terminal uses when sending the radio signal, a correspondence exists between the radio signal and the transmit power information that the terminal uses when sending the radio signal, and the acquiring first information includes:

when the network device is the first access device or the second access device, determining, by the first access device or the second access device according to the received radio signal, the transmit power information that the terminal uses when sending the radio signal; or when the network device is the network entity, receiving, by the network entity, the transmit power information that is determined by the first access device or the second access device and the terminal uses when sending the radio signal; or receiving, by the network entity, radio signal information sent by the first access device or the second access device, and determining, according to the correspondence and the radio signal information, the transmit power information that the terminal uses when sending the radio signal.

With reference to the first aspect or any one of the first to the fifth possible implementation manners of the first aspect, in a ninth possible implementation manner of the first aspect, the acquiring, by the network device, receive power information that is used by the first access device to receive the radio signal sent by the terminal includes:

when the network device is the first access device, receiving, by the first access device, the radio signal or a predetermined radio signal according to characteristic information of the terminal, and acquiring the receive power information that is used by the first access device to receive the radio signal sent by the terminal; or when the network device is the second access device or the network entity, receiving, by the second access device or the network entity, the receive power information that is used by the first access device to receive the radio signal sent by the terminal and is sent by the first access device.

With reference to the second possible implementation manner of the first aspect, in a tenth possible implementation manner of the first aspect, when the interference power information is the interference power information received by the first access device, the acquiring, by the network device, the interference power information received by the first access device interference includes:

when the network device is the first access device, acquiring, by the first access device, the interference power information received by the first access device; or when the network device is the second access device or the network entity, receiving, by the second access device or the network entity, the interference power information that is received by the first access device and sent by the first access device.

With reference to the second possible implementation manner of the first aspect, in an eleventh possible implementation manner of the first aspect, when the interference power information is the interference power information received by the first access device, the determining, by the network device according to the first information, the receive power information that is used by the first access device to receive the radio signal sent by the terminal, and the interference power information, whether the terminal can be served by the first access device includes:

determining, by the network device according to the first information, the receive power information that is used by the first access device to receive the radio signal sent by the terminal, the interference power information received by the first access device, and transmit power information, which is used when the terminal is served by the first access device, of the terminal, whether the terminal can be served by the first access device.

With reference to the second possible implementation manner of the first aspect, in a twelfth possible implementation manner of the first aspect, when the interference power information is the interference power information received by the terminal, the acquiring, by the network device, interference power information includes:

when the network device is the second access device, receiving, by the second access device, the interference power information that is received by the terminal and sent by the terminal; or when the network device is the first access device or the network entity, receiving, by the first access device or the network entity, the interference power information that received by the terminal and is sent by the second receiving device.

With reference to the second possible implementation manner of the first aspect, in a thirteenth possible implementation manner of the first aspect, when the interference power information is the interference power information received by the terminal, the determining, by the network device according to the first information, the receive power information that is used by the first access device to receive the radio signal sent by the terminal, and the interference power information, whether the terminal can be served by the first access device includes:

determining, by the network device according to the first information, the receive power information that is used by the first access device to receive the radio signal sent by the terminal, the interference power information received by the terminal, and transmit power information, which is used when the terminal is served by the first access device, of the first access device, whether the terminal can be served by the first access device.

With reference to the first aspect or any one of the first to fifth possible implementation manners of the first aspect, in a fourteenth possible implementation manner of the first aspect, the radio signal is sent by the terminal according to characteristic information, where the characteristic information includes at least one of the following:

a cell identity;
a terminal identifier; and
a configuration message that is configured by the second access device for the terminal to send the radio signal.

With reference to the fourteenth possible implementation manner of the first aspect, in a fifteenth possible implementation manner of the first aspect, the configuration message that is configured by the second access device for the terminal to send the radio signal includes at least one of the following:

time domain resource information, frequency domain resource information, code domain resource information, and space domain resource information.

According to a second aspect, an uplink detection-based processing method is provided, including:

sending, by a terminal, a radio signal, and reporting second information to a second access device, where the radio signal enables a first access device to acquire receive power information that is used by the first access device to receive the radio signal sent by the terminal, and the second information is transmit power information that the terminal uses when sending the radio signal or the second information is measurement information for the second access device obtained by the terminal, so as to enable a network device to: when the second information is the transmit power information that the terminal uses when sending the radio signal, perform processing according to the transmit power information that the terminal uses when sending the radio signal and the receive power information that is used by the first access device to receive the radio signal sent by the terminal; or when the second information is the measurement information for the second access device obtained by the terminal, perform processing according to receive power information that is used by the second access device to receive the radio signal sent by the terminal, transmit power information of the second access device, the measurement information for the second access device obtained by the terminal, and the receive power information that is used by the first access device to receive the radio signal sent by the terminal; or sending, by a terminal, a radio signal, where the radio signal enables a first access device to acquire receive power information that is used by the first access device to receive the radio signal sent by the terminal, and enables a second access device to acquire receive power information that is used by the second access device to receive the radio signal sent by the terminal, so as to enable a network device to perform processing according to the receive power information that is used by the first access device to receive the radio signal sent by the terminal, the receive power information that is used by the second access device to receive the radio signal sent by the terminal, and information about path loss from the second access device to the terminal, where the network device is the first access device, the second access device, or a network entity, the network entity is a network device different from the first access device and the second access device, and the second access device is an access device that currently serves the terminal.

With reference to the second aspect, in a first possible implementation manner of the second aspect, the method further includes:

reporting, by the terminal to the second access device, interference power information received by the terminal, so as to enable the network device to: when the second information is the transmit power information that the terminal uses when sending the radio signal, determine, according to the transmit power information that the terminal uses when sending the radio signal, the receive power information that is used by the first access device to receive the radio signal sent by the terminal, the interference power information received by the terminal, and transmit power information, which is used when the terminal is served by the first access device, of the first access device, whether the ten final can be served by the first access device; or enable the network device to: when the second information is the measurement information for the second access device obtained by the terminal, determine, according to the receive power information that is used by the second access device to receive the radio signal sent by the terminal, the transmit power information of the second access device, the measurement information for the second access device obtained by the terminal, the receive power information that is used by the first access device to receive the radio signal sent by the terminal, the interference power information received by the terminal, and transmit power information, which is used when the terminal is served by the first access device, of the first access device, whether the terminal can be served by the first access device; or enable the network device to determine, according to the receive power information that is used by the first access device to receive the radio signal sent by the terminal, the receive power information that is used by the second access device to receive the radio signal sent by the terminal, the information about the path loss from the second access device to the terminal, the interference power information received by the terminal, and transmit power information, which is used when the terminal is served by the first access device, of the first access device, whether the terminal can be served by the first access device.

With reference to the second aspect or the first possible implementation manner of the second aspect, in a second possible implementation manner of the second aspect, the sending, by a terminal, a radio signal includes:

sending, by the terminal according to transmit power information configured by the second access device, the radio signal by using the configured transmit power information; or sending, by the terminal according to a correspondence between a radio signal and transmit power information, the radio signal by using transmit power information corresponding to the radio signal; or sending, by the terminal according to transmit power information predetermined by the second access device and the terminal, the radio signal by using the predetermined transmit power information.

With reference to the second aspect or the first possible implementation manner of the second aspect, in a third possible implementation manner of the second aspect, the sending, by a terminal, a radio signal includes:

sending, by the terminal according to characteristic information configured by the second access device, the radio signal by using the configured characteristic information; or sending, by the terminal according to a radio signal predetermined by the second access device and the terminal, the predetermined radio signal.

According to a third aspect, a network device is provided, including:

a first acquiring module, configured to acquire first information, where the first information is transmit power information that a terminal uses when sending a radio signal; or the first information includes receive power information that is used by a second access device to receive the radio signal sent by the terminal and information about path loss from the second access device to the terminal; or the first information includes receive power information that is used by a second access device to receive the radio signal sent by the terminal, transmit power information of the second access device, and measurement information for the second access device obtained by the terminal;

a second acquiring module, configured to acquire receive power information that is used by the first access device to receive the radio signal sent by the terminal; and a processing module, configured to perform processing according to the first information and the receive power information that is used by the first access device to receive the radio signal sent by the terminal, where the network device is the first access device, the second access device, or a network entity, the network entity is a network device different from the first access device and the second access device, and the second access device is an access device that currently serves the terminal.

With reference to the third aspect, in a first possible implementation manner of the third aspect, the processing module is specifically configured to:

determine, according to the first information and the receive power information that is used by the first access device to receive the radio signal sent by the terminal, whether the terminal can be served by the first access device.

With reference to the third aspect, in a second possible implementation manner of the third aspect, the network device further includes:

a third acquiring module, configured to acquire interference power information, where the interference power information is interference power information received by the first access device or interference power information that is received by the terminal and reported by the terminal, where the processing module is specifically configured to determine, according to the first information, the receive power information that is used by the first access device to receive the radio signal sent by the terminal, and the interference power information, whether the terminal can be served by the first access device.

With reference to the first possible implementation manner of the third aspect, in a third possible implementation manner of the third aspect, the processing module is specifically configured to:

determine path loss between the terminal and the first access device according to the first information and the receive power information that is used by the first access device to receive the radio signal sent by the terminal, and determine, according to the path loss between the terminal and the first access device, whether the terminal can be served by the first access device.

With reference to the second possible implementation manner of the third aspect, in a fourth possible implementation manner of the third aspect, the processing module is specifically configured to:

when the interference power information is the interference power information received by the first access device, enable the network device to determine signal quality according to the first information, the receive power information that is used by the first access device to receive the radio signal sent by the terminal, the interference power information received by the first access device, and transmit power information, which is used when the terminal is served by the first access device, of the terminal, and determine, according to the signal quality, that the terminal can be served by the first access device; or enable the network device to determine path loss between the terminal and the first access device according to the first information and the receive power information that is used by the first access device to receive the radio signal sent by the terminal; and enable the network device to determine signal quality according to the first information, the receive power information that is used by the first access device to receive the radio signal sent by the terminal, the interference power information received by the first access device, and transmit power information, which is used when the terminal is served by the first access device, of the terminal, and determine, according to the path loss between the terminal and the first access device, and the signal quality, whether the terminal can be served by the first access device; or when the interference power information is the interference power information received by the terminal, enable the network device to determine signal quality according to the first information, the receive power information that is used by the first access device to receive the radio signal sent by the terminal, the interference power information received by the terminal, and transmit power information, which is used when the terminal is served by the first access device, of the first access device, and determine, according to the signal quality, whether the terminal can be served by the first access device; or enable the network device to determine path loss between the terminal and the first access device according to the first information and the receive power information that is used by the first access device to receive the radio signal sent by the terminal; and enable the network device to determine signal quality according to the first information, the receive power information that is used by the first access device to receive the radio signal sent by the terminal, the interference power information received by the terminal, and transmit power information, which is used when the terminal is served by the first access device, of the first access device, and determine, according to the path loss between the terminal and the first access device, and the signal quality, whether the terminal can be served by the first access device.

With reference to the third aspect, in a fifth possible implementation manner of the third aspect, the processing module is specifically configured to:

start a transmitter of the first access device according to the first information and the receive power information that is used by the first access device to receive the radio signal sent by the terminal; or determine path loss between the terminal and the first access device according to the first information and the receive power information that is used by the first access device to receive the radio signal sent by the terminal.

With reference to the third aspect or any one of the first to the fifth possible implementation manners of the third aspect, in a sixth possible implementation manner of the third aspect, the first information is the transmit power information that the terminal uses when sending the radio signal, and the first acquiring module is specifically configured to:

when the network device is the second access device, receive the transmit power information that is sent by the terminal and the terminal uses when sending the radio signal; or receive the measurement information reported by the terminal, and determine, according to the transmit power information of the second access device, the receive power information that is used by the second access device to receive the radio signal sent by the terminal, and the measurement information, the transmit power information that the terminal uses when sending the radio signal; or determine the transmit power information that the terminal uses when sending the radio signal, where the transmit power information that the terminal uses when sending the radio signal is configured by the second access device for the terminal or predetermined by the second access device and the terminal; or when the network device is the first access device or the network entity, receive the first information sent by the second access device.

With reference to the third aspect or any one of the first to the fifth possible implementation manners of the third aspect, in a seventh possible implementation manner of the third aspect, the first information includes the receive power information that is used by the second access device to receive the radio signal sent by the terminal and the information about the path loss from the second access device to the terminal, or the first information includes the receive power information that is used by the second access device to receive the radio signal sent by the terminal, the transmit power information of the second access device, and the measurement information for the second access device obtained by the terminal; and the first acquiring module is specifically configured to:

when the network device is the second access device, acquire the receive power information that is used by the second access device to receive the radio signal sent by the terminal, acquire the measurement information reported by the terminal, and acquire the transmit power information of the second access device; or acquire the receive power information that is used by the second access device to receive the radio signal sent by the terminal, and acquire the information about the path loss from the second access device to the terminal; and when the network device is the first access device or the network entity, receive the first information sent by the second access device.

With reference to the third aspect or any one of the first to the fifth possible implementation manners of the third aspect, in an eighth possible implementation manner of the third aspect, the first information is the transmit power information that the terminal uses when sending the radio signal, a correspondence exists between the radio signal and the transmit power information that the terminal uses when sending the radio signal, and the first acquiring module is specifically configured to:

when the network device is the first access device or the second access device, determine, according to the received radio signal, the transmit power information that the terminal uses when sending the radio signal; or when the network device is the network entity, receive the transmit power information that is determined by the first access device or the second access device and the terminal uses when sending the radio signal; or receive radio signal information sent by the first access device or the second access device, and determine, according to the correspondence and the radio signal information, the transmit power information that the terminal uses when sending the radio signal.

With reference to the third aspect or any one of the first to the fifth possible implementation manners of the third aspect, in a ninth possible implementation manner of the third aspect, the second acquiring module is specifically configured to:

when the network device is the first access device, receive the radio signal or a predetermined radio signal according to characteristic information of the terminal, and acquire the receive power information that is used by the first access device to receive the radio signal sent by the terminal; or when the network device is the second access device or the network entity, receive the receive power information that is used by the first access device to receive the radio signal sent by the terminal and is sent by the first access device.

With reference to the second possible implementation manner of the third aspect, in a tenth possible implementation manner of the third aspect, when the interference power information is the interference power information received by the first access device, the third acquiring module is specifically configured to:

when the network device is the first access device, acquire the interference power information received by the first access device; or when the network device is the second access device or the network entity, receive the interference power information that is received by the first access device and sent by the first access device.

With reference to the second possible implementation manner of the third aspect, in an eleventh possible implementation manner of the third aspect, when the interference power information is the interference power information received by the first access device, the processing module is specifically configured to:

determine, according to the first information, the receive power information that is used by the first access device to receive the radio signal sent by the terminal, the interference power information received by the first access device, and transmit power information, which is used when the terminal is served by the first access device, of the terminal, whether the terminal can be served by the first access device.

With reference to the second possible implementation manner of the third aspect, in a twelfth possible implementation manner of the third aspect, when the interference power information is the interference power information received by the terminal, the third acquiring module is specifically configured to:

when the network device is the second access device, receive the interference power information that is received by the terminal and sent by the terminal; or when the network device is the first access device or the network entity, receive the interference power information that is received by the terminal and sent by the second receiving device.

With reference to the second possible implementation manner of the third aspect, in a thirteenth possible implementation manner of the third aspect, when the interference power information is the interference power information received by the terminal, the processing module is specifically configured to:

determine, according to the first information, the receive power information that is used by the first access device to receive the radio signal sent by the terminal, the interference power information received by the terminal, and transmit power information, which is used when the terminal is served by the first access device, of the first access device, whether the terminal can be served by the first access device.

With reference to the third aspect or any one of the first to fifth possible implementation manners of the third aspect, in a fourteenth possible implementation manner of the third aspect, the radio signal is sent by the terminal according to characteristic information, where the characteristic information includes at least one of the following:

a cell identity;

a terminal identifier; and a configuration message that is configured by the second access device for the terminal to send the radio signal.

With reference to the fourteenth possible implementation manner of the third aspect, in a fifteenth possible implementation manner of the third aspect, the configuration message that is configured by the second access device for the terminal to send the radio signal includes at least one of the following:

time domain resource information, frequency domain resource information, code domain resource information, and space domain resource information.

According to a fourth aspect, a terminal is provided, including:

a first sending module, configured to send a radio signal, and report second information to a second access device, where the radio signal enables a first access device to acquire receive power information that is used by the first access device to receive the radio signal sent by the terminal, and the second information is transmit power information that the terminal uses when sending the radio signal or the second information is measurement information for the second access device obtained by the terminal, so as to enable a network device to: when the second information is the transmit power information that the terminal uses when sending the radio signal, perform processing according to the transmit power information that the terminal uses when sending the radio signal and the receive power information that is used by the first access device to receive the radio signal sent by the terminal; or when the second information is the measurement information for the second access device obtained by the terminal, perform processing according to receive power information that is used by the second access device to receive the radio signal sent by the terminal, transmit power information of the second access device, the measurement information for the second access device obtained by the terminal, and the receive power information that is used by the first access device to receive the radio signal sent by the terminal; or a second sending module, configured to send a radio signal, where the radio signal enables a first access device to acquire receive power information that is used by the first access device to receive the radio signal sent by the terminal, and enables a second access device to acquire receive power information that is used by the second access device to receive the radio signal sent by the terminal, so as to enable a network device to perform processing according to the receive power information that is used by the first access device to receive the radio signal sent by the terminal, the receive power information that is used by the second access device to receive the radio signal sent by the terminal, and information about path loss from the second access device to the terminal, where the network device is the first access device, the second access device, or a network entity, the network entity is a network device different from the first access device and the second access device, and the second access device is an access device that currently serves the terminal.

With reference to the fourth aspect, in a first possible implementation manner of the fourth aspect, the terminal further includes:

a third sending module, configured to report, to the second access device, interference power information received by the terminal, so as to enable the network device to: when the second information is the transmit power information that the terminal uses when sending the radio signal, determine, according to the transmit power information that the terminal uses when sending the radio signal, the receive power information that is used by the first access device to receive the radio signal sent by the terminal, the interference power information received by the terminal, and transmit power information, which is used when the terminal is served by the first access device, of the first access device, whether the terminal can be served by the first access device; or enable the network device to: when the second information is the measurement information for the second access device obtained by the terminal, determine, according to the receive power information that is used by the second access device to receive the radio signal sent by the terminal, the transmit power information of the second access device, the measurement information for the second access device obtained by the terminal, the receive power information that is used by the first access device to receive the radio signal sent by the terminal, the interference power information received by the terminal, and transmit power information, which is used when the terminal is served by the first access device, of the first access device, whether the terminal can be served by the first access device; or enable the network device to determine, according to the receive power information that is used by the first access device to receive the radio signal sent by the terminal, the receive power information that is used by the second access device to receive the radio signal sent by the terminal, the information about the path loss from the second access device to the terminal, the interference power information received by the terminal, and transmit power information, which is used when the terminal is served by the first access device, of the first access device, whether the terminal can be served by the first access device.

With reference to the fourth aspect or the first possible implementation manner of the fourth aspect, in a second possible implementation manner of the fourth aspect, the first sending module is specifically configured to:

send, according to transmit power information configured by the second access device, the radio signal by using the configured transmit power information; or send, according to a correspondence between a radio signal and transmit power information, the radio signal by using transmit power information corresponding to the radio signal; or send, according to transmit power information predetermined by the second access device and the terminal, the radio signal by using the predetermined transmit power information.

With reference to the fourth aspect or the first possible implementation manner of the fourth aspect, in a third possible implementation manner of the fourth aspect, the first sending module is specifically configured to:

send, according to characteristic information configured by the second access device, the radio signal by using the configured characteristic information; or send, according to a radio signal predetermined by the second access device and the terminal, the predetermined radio signal.

According to a fifth aspect, a network device is provided, including:

a transceiver, configured to acquire first information, where the first information is transmit power information that a terminal uses when sending a radio signal; or the first information includes receive power information that is used by a second access device to receive the radio signal sent by the terminal, and information about path loss from the second access device to the terminal; or the first information includes receive power information that is used by a second access device to receive the radio signal sent by the terminal, transmit power information of the second access device, and measurement information for the second access device obtained by the terminal; and acquire receive power information that is used by the first access device to receive the radio signal sent by the terminal; and a processor, configured to perform processing according to the first information and the receive power information that is used by the first access device to receive the radio signal sent by the terminal, where the network device is the first access device, the second access device, or a network entity, the network entity is a network device different from the first access device and the second access device, and the second access device is an access device that currently serves the terminal.

With reference to the fifth aspect, in a first possible implementation manner of the fifth aspect, the processor is specifically configured to:

determine, according to the first information and the receive power information that is used by the first access device to receive the radio signal sent by the terminal, whether the terminal can be served by the first access device.

With reference to the fifth aspect, in a second possible implementation manner of the fifth aspect, the transceiver is further configured to:

acquire interference power information, where the interference power information is interference power information received by the first access device or interference power information that is received by the terminal and reported by the terminal; and the processor is specifically configured to determine, according to the first information, the receive power information that is used by the first access device to receive the radio signal sent by the terminal, and the interference power information, whether the terminal can be served by the first access device.

With reference to the first possible implementation manner of the fifth aspect, in a third possible implementation manner of the fifth aspect, the processor is specifically configured to:

determine path loss between the terminal and the first access device according to the first information and the receive power information that is used by the first access device to receive the radio signal sent by the terminal, and determine, according to the path loss between the terminal and the first access device, whether the terminal can be served by the first access device.

With reference to the second possible implementation manner of the fifth aspect, in a fourth possible implementation manner of the fifth aspect, the processor is specifically configured to:

when the interference power information is the interference power information received by the first access device, determine signal quality according to the first information, the receive power information that is used by the first access device to receive the radio signal sent by the terminal, the interference power information received by the first access device, and transmit power information, which is used when the terminal is served by the first access device, of the terminal, and determine, according to the signal quality, whether the terminal can be served by the first access device; or determine path loss between the terminal and the first access device according to the first information and the receive power information that is used by the first access device to receive the radio signal sent by the terminal; and enable the network device to determine signal quality according to the first information, the receive power information that is used by the first access device to receive the radio signal sent by the terminal, the interference power information received by the first access device, and transmit power information, which is used when the terminal is served by the first access device, of the terminal, and determine, according to the path loss between the terminal and the first access device, and the signal quality, whether the terminal can be served by the first access device; or when the interference power information is the interference power information received by the terminal, determine signal quality according to the first information, the receive power information that is used by the first access device to receive the radio signal sent by the terminal, the interference power information received by the terminal, and transmit power information, which is used when the terminal is served by the first access device, of the first access device, and determine, according to the signal quality, whether the terminal can be served by the first access device; or determine path loss between the terminal and the first access device according to the first information and the receive power information that is used by the first access device to receive the radio signal sent by the terminal; enable the network device to determine signal quality according to the first information, the receive power information that is used by the first access device to receive the radio signal sent by the terminal, the interference power information received by the terminal, and transmit power information, which is used when the terminal is served by the first access device, of the first access device; and determine, according to the path loss between the terminal and the first access device, and the signal quality, whether the terminal can be served by the first access device.

With reference to the fifth aspect, in a fifth possible implementation manner of the fifth aspect, the processor is specifically configured to:

start a transmitter of the first access device according to the first information and the receive power information that is used by the first access device to receive the radio signal sent by the terminal; or determine path loss between the terminal and the first access device according to the first information and the receive power information that is used by the first access device to receive the radio signal sent by the terminal.

With reference to the fifth aspect or any one of the first to the fifth possible implementation manners of the fifth aspect, in a sixth possible implementation manner of the fifth aspect, the first information is the transmit power information that the terminal uses when sending the radio signal, and the transceiver is specifically configured to:

when the network device is the second access device, receive the transmit power information that is sent by the terminal and the terminal uses when sending the radio signal; or receive the measurement information reported by the terminal, and determine, according to the transmit power information of the second access device, the receive power information that is used by the second access device to receive the radio signal sent by the terminal, and the measurement information, the transmit power information that the terminal uses when sending the radio signal; or determine the transmit power information that the terminal uses when sending the radio signal, where the transmit power information that the terminal uses when sending the radio signal is configured by the second access device for the terminal or predetermined by the second access device and the terminal; or when the network device is the first access device or the network entity, receive the first information sent by the second access device.

With reference to the fifth aspect or any one of the first to the fifth possible implementation manners of the fifth aspect, in a seventh possible implementation manner of the fifth aspect, the first information includes the receive power information that is used by the second access device to receive the radio signal sent by the terminal and the information about the path loss from the second access device to the terminal, or the first information includes the receive power information that is used by the second access device to receive the radio signal sent by the terminal, the transmit power information of the second access device, and the measurement information for the second access device obtained by the terminal; and the transceiver is specifically configured to:

when the network device is the second access device, receive the receive power information that is used when the terminal sends the radio signal, where the second access device acquires the measurement information reported by the terminal, and the second access device acquires the transmit power information of the second access device; or acquire the receive power information that is used by the second access device to receive the radio signal sent by the terminal, where the second access device acquires the information about the path loss from the second access device to the terminal; and when the network device is the first access device or the network entity, receive the first information sent by the second access device.

With reference to the fifth aspect or any one of the first to the fifth possible implementation manners of the fifth aspect, in an eighth possible implementation manner of the fifth aspect, the first information is the transmit power information that the terminal uses when sending the radio signal, a correspondence exists between the radio signal and the transmit power information that the terminal uses when sending the radio signal, and the transceiver is specifically configured to:

when the network device is the first access device or the second access device, determine, according to the received radio signal, the transmit power information that the terminal uses when sending the radio signal; or when the network device is the network entity, receive the transmit power information that is determined by the first access device or the second access device and the terminal uses when sending the radio signal; or receive radio signal information sent by the first access device or the second access device, and determine, according to the correspondence and the radio signal information, the transmit power information that the terminal uses when sending the radio signal.

With reference to the fifth aspect or any one of the first to the fifth possible implementation manners of the fifth aspect, in a ninth possible implementation manner of the fifth aspect, the transceiver is specifically configured to:

when the network device is the first access device, receive the radio signal or a predetermined radio signal according to characteristic information of the terminal, and acquire the receive power information that is used by the first access device to receive the radio signal sent by the terminal; or when the network device is the second access device or the network entity, receive the receive power information that is used by the first access device to receive the radio signal sent by the terminal and is sent by the first access device.

With reference to the second possible implementation manner of the fifth aspect, in a tenth possible implementation manner of the fifth aspect, when the interference power information is the interference power information received by the first access device, the transceiver is specifically configured to:

when the network device is the first access device, acquire the interference power information received by the first access device; or when the network device is the second access device or the network entity, receive the interference power information that is received by the first access device and sent by the first access device.

With reference to the second possible implementation manner of the fifth aspect, in an eleventh possible implementation manner of the fifth aspect, when the interference power information is the interference power information received by the first access device, the processor is specifically configured to:

determine, according to the first information, the receive power information that is used by the first access device to receive the radio signal sent by the terminal, the interference power information received by the first access device, and transmit power information, which is used when the terminal is served by the first access device, of the terminal, whether the terminal can be served by the first access device.

With reference to the second possible implementation manner of the fifth aspect, in a twelfth possible implementation manner of the fifth aspect, when the interference power information is the interference power information received by the terminal, the transceiver is specifically configured to:

when the network device is the second access device, receive the interference power information that is received by the terminal and sent by the terminal; or when the network device is the first access device or the network entity, receive the interference power information that is received by the terminal and sent by the second receiving device.

With reference to the second possible implementation manner of the fifth aspect, in a thirteenth possible implementation manner of the fifth aspect, when the interference power information is the interference power information received by the terminal, the processor is specifically configured to:

determine, according to the first information, the receive power information that is used by the first access device to receive the radio signal sent by the terminal, the interference power information received by the terminal, and transmit power information, which is used when the terminal is served by the first access device, of the first access device, whether the terminal can be served by the first access device.

With reference to the fifth aspect or any one of the first to fifth possible implementation manners of the fifth aspect, in a fourteenth possible implementation manner of the fifth aspect, the radio signal is sent by the terminal according to characteristic information, where the characteristic information includes at least one of the following:

a cell identity;

a terminal identifier; and a configuration message that is configured by the second access device for the terminal to send the radio signal.

With reference to the fourteenth possible implementation manner of the fifth aspect, in a fifteenth possible implementation manner of the fifth aspect, the configuration message that is configured by the second access device for the terminal to send the radio signal includes at least one of the following:

time domain resource information, frequency domain resource information, code domain resource information, and space domain resource information.

According to a sixth aspect, a terminal is provided, including:

a transceiver, configured to send a radio signal, and report second information to a second access device, where the radio signal enables a first access device to acquire receive power information that is used by the first access device to receive the radio signal sent by the terminal, and the second information is transmit power information that the terminal uses when sending the radio signal or the second information is measurement information for the second access device obtained by the terminal, so as to enable a network device to: when the second information is the transmit power information that the terminal uses when sending the radio signal, perform processing according to the transmit power information that the terminal uses when sending the radio signal and the receive power information that is used by the first access device to receive the radio signal sent by the terminal; or when the second information is the measurement information for the second access device obtained by the terminal, perform processing according to receive power information that is used by the second access device to receive the radio signal sent by the terminal, transmit power information of the second access device, the measurement information for the second access device obtained by the terminal, and the receive power information that is used by the first access device to receive the radio signal sent by the terminal; or the transceiver, configured to send a radio signal, where the radio signal enables a first access device to acquire receive power information that is used by the first access device to receive the radio signal sent by the terminal, and enables a second access device to acquire receive power information that is used by the second access device to receive the radio signal sent by the terminal, so as to enable a network device to perform processing according to the receive power information that is used by the first access device to receive the radio signal sent by the terminal, the receive power information that is used by the second access device to receive the radio signal sent by the terminal, and information about path loss from the second access device to the terminal, where the network device is the first access device, the second access device, or a network entity, the network entity is a network device different from the first access device and the second access device, and the second access device is an access device that currently serves the terminal.

With reference to the sixth aspect, in a first possible implementation manner of the sixth aspect, the transceiver is further configured to:

Report, to the second access device, interference power information received by the terminal, so as to enable the network device to: when the second information is the transmit power information that the terminal uses when sending the radio signal, determine, according to the transmit power information that the terminal uses when sending the radio signal, the receive power information that is used by the first access device to receive the radio signal sent by the terminal, the interference power information received by the terminal, and transmit power information, which is used when the terminal is served by the first access device, of the first access device, whether the terminal can be served by the first access device; or enable the network device to: when the second information is the measurement information for the second access device obtained by the terminal, determine, according to the receive power information that is used by the second access device to receive the radio signal sent by the terminal, the transmit power information of the second access device, the measurement information for the second access device obtained by the terminal, the receive power information that is used by the first access device to receive the radio signal sent by the terminal, the interference power information received by the terminal, and transmit power information, which is used when the terminal is served by the first access device, of the first access device, whether the terminal can be served by the first access device; or enable the network device to determine, according to the receive power information that is used by the first access device to receive the radio signal sent by the terminal, the receive power information that is used by the second access device to receive the radio signal sent by the terminal, the information about the path loss from the second access device to the terminal, the interference power information received by the terminal, and transmit power information, which is used when the terminal is served by the first access device, of the first access device, whether the terminal can be served by the first access device.

With reference to the sixth aspect or the first possible implementation manner of the sixth aspect, in a second possible implementation manner of the sixth aspect, the transceiver is specifically configured to:

send, according to transmit power information configured by the second access device, the radio signal by using the configured transmit power information; or send, according to a correspondence between a radio signal and transmit power information, the radio signal by using transmit power information corresponding to the radio signal; or send, according to transmit power information predetermined by the second access device and the terminal, the radio signal by using the predetermined transmit power information.

With reference to the sixth aspect or the first possible implementation manner of the sixth aspect, in a third possible implementation manner of the sixth aspect, the transceiver is specifically configured to:

send, according to characteristic information configured by the second access device, the radio signal by using the configured characteristic information; or send, according to a radio signal predetermined by the second access device and the terminal, the predetermined radio signal.

According to the foregoing technical solutions, a network device may acquire first information, then may implement uplink detection-based processing according to the first information and receive power information that a first access device uses when receiving the radio signal, and may further determine, according to a processing result, whether a terminal falls within coverage of a low-power base station, or determine path loss and start a transmitter, and so on.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description show some embodiments of the present application, and a person of ordinary skill in the art may still derive other drawings from these accompanying drawings without creative efforts.

DETAILED DESCRIPTION

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are a part rather than all of the embodiments of the present application. All other embodiments obtained by a person of ordinary skill in the art based on the embodiments of the present application without creative efforts shall fall within the protection scope of the present application.

Figure 1:
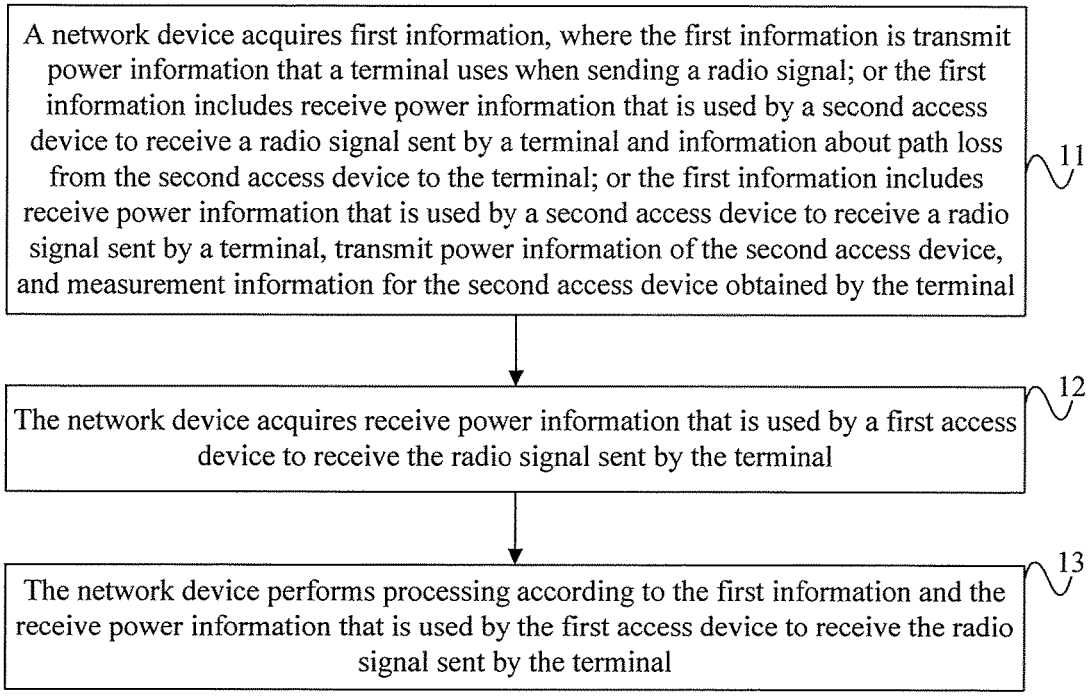
FIG. 1 is a schematic flowchart of an embodiment of an uplink detection-based processing method according to the present application.

FIG. 1 is a schematic flowchart of an embodiment of an uplink detection-based processing method according to the present application, where the method includes:

Step 11. A network device acquires first information, where the first information is transmit power information that a terminal uses when sending a radio signal; or the first information includes receive power information that is used by a second access device to receive the radio signal sent by the terminal and information about path loss from the second access device to the terminal; or the first information includes receive power information that is used by a second access device to receive the radio signal sent by the terminal, transmit power information of the second access device, and measurement information for the second access device obtained by the terminal.

Step 12. The network device acquires receive power information that is used by the first access device to receive the radio signal sent by the terminal.

Step 13. The network device performs processing according to the first information and the receive power information that is used by the first access device to receive the radio signal sent by the terminal.

The network device is the first access device, the second access device, or a network entity, the network entity is a network device different from the first access device and the second access device, and the second access device is an access device that currently serves the terminal.

The foregoing access device may specifically be a macro base station, for example, a Macro eNB; a low-power base station, for example, a Pico eNB and an Femto eNB; or an access node of another type, for example, a home base station (Home eNB), a low mobility base station (LoMo), a local wireless access point (AP), a low power transmit node (LPN) or a remote radio unit (RRU).

That the first access device is a low-power base station and the second access device is a macro base station is used as an example in this embodiment of the present application.

The foregoing network entity may be a controller, for example, a base station controller (BSC), a radio network controller (RNC), or a centralized controller.

The foregoing processing may include: determining whether the terminal can be served by the first access device, or starting a transmitter of the first access device; or determining path loss between the terminal and the first access device.

Energy saving of an access device or service switching for a terminal may be implemented by means of the foregoing processing.

The foregoing power information (including transmit power information or receive power information) may be a power value or an index of a power value, and the power value may be determined according to the index.

The foregoing measurement information is receive power that the terminal uses when receiving a radio signal sent by the second access device; or signal quality of a radio signal received by the terminal and sent by the second access device, for example, receive power of a reference signal, receive power of a pilot signal, receive power of a CSI-RS, quality of a reference signal, or quality of a pilot signal.

Figure 2:
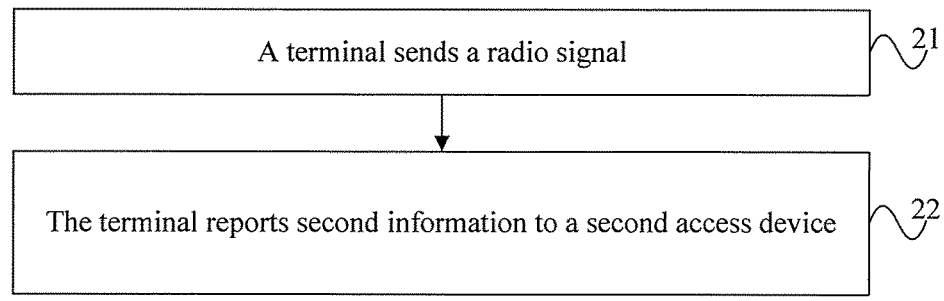
FIG. 2 is a schematic flowchart of another embodiment of an uplink detection-based processing method according to the present application.

Correspondingly, for steps executed on a terminal side, refer to FIG. 2, where the steps includes:

Step 21. A terminal sends a radio signal, where the radio signal enables a first access device to acquire receive power information that is used by the first access device to receive the radio signal sent by the terminal.

Step 22. The terminal reports second information to a second access device, where the second information is transmit power information that the terminal uses when sending the radio signal or the second information is measurement information for the second access device obtained by the terminal, so as to enable a network device to: when the second information is the transmit power information that the terminal uses when sending the radio signal, perform processing according to the transmit power information that the terminal uses when sending the radio signal and the receive power information that is used by the first access device to receive the radio signal sent by the terminal; or when the second information is the measurement information for the second access device obtained by the terminal, perform processing according to receive power information that is used by the second access device to receive the radio signal sent by the terminal, transmit power information of the second access device, the measurement information for the second access device obtained by the terminal, and the receive power information that is used by the first access device to receive the radio signal sent by the terminal.

Optionally, in place of steps 21 to 22, the following may further be included: a terminal sends a radio signal, where the radio signal enables a first access device to acquire receive power information that is used by the first access device to receive the radio signal sent by the terminal, and enables a second access device to acquire receive power information that is used by the second access device to receive the radio signal sent by the terminal, so as to enable a network device to perform processing according to the receive power information that is used by the first access device to receive the radio signal sent by the terminal, the receive power information that is used by the second access device to receive the radio signal sent by the terminal, and information about path loss from the second access device to the terminal.

The network device is the first access device, the second access device, or a network entity, the network entity is a network device different from the first access device and the second access device, and the second access device is an access device that currently serves the terminal.

The terminal is a terminal served by a macro base station, for example, the foregoing MUE.

Optionally, the method may further include:

reporting, by the terminal to the second access device, interference power information received by the terminal, so as to enable the network device to: when the second information is the transmit power information that the terminal uses when sending the radio signal, determine, according to the transmit power information that the terminal uses when sending the radio signal, the receive power information that is used by the first access device to receive the radio signal sent by the terminal, the interference power information received by the terminal, and transmit power information, which is used when the terminal is served by the first access device, of the first access device, whether the terminal can be served by the first access device; or enable the network device to: when the second information is the measurement information for the second access device obtained by the terminal, determine, according to the receive power information that is used by the second access device to receive the radio signal sent by the terminal, the transmit power information of the second access device, the measurement information for the second access device obtained by the terminal, the receive power information that is used by the first access device to receive the radio signal sent by the terminal, the interference power information received by the terminal, and transmit power information, which is used when the terminal is served by the first access device, of the first access device, whether the terminal can be served by the first access device; or enable the network device to determine, according to the receive power information that is used by the first access device to receive the radio signal sent by the terminal, the receive power information that is used by the second access device to receive the radio signal sent by the terminal, the information about the path loss from the second access device to the terminal, the interference power information received by the terminal, and transmit power information, which is used when the terminal is served by the first access device, of the first access device, whether the terminal can be served by the first access device.

Optionally, that the terminal sends the radio signal includes that:

the terminal sends, according to transmit power information configured by the second access device, the radio signal by using the configured transmit power information; or the terminal sends, according to a correspondence between a radio signal and transmit power information, the radio signal by using the transmit power information corresponding to the radio signal; or the terminal sends, according to transmit power information predetermined by the second access device and the terminal, the radio signal by using the predetermined transmit power information.

Optionally, that the terminal sends the radio signal includes that:

the terminal sends, according to characteristic information configured by the second access device, the radio signal by using the configured characteristic information; or the terminal sends, according to a radio signal predetermined by the second access device and the terminal, the predetermined radio signal.

In this embodiment, a network device may acquire uplink-related first information, then may implement uplink detection-based processing according to the first information and receive power information that a first access device uses when receiving the radio signal, and may further determine, according to a processing result, whether a terminal falls within coverage of a low-power base station, or determine path loss and start a transmitter, and so on.

Figure 3:
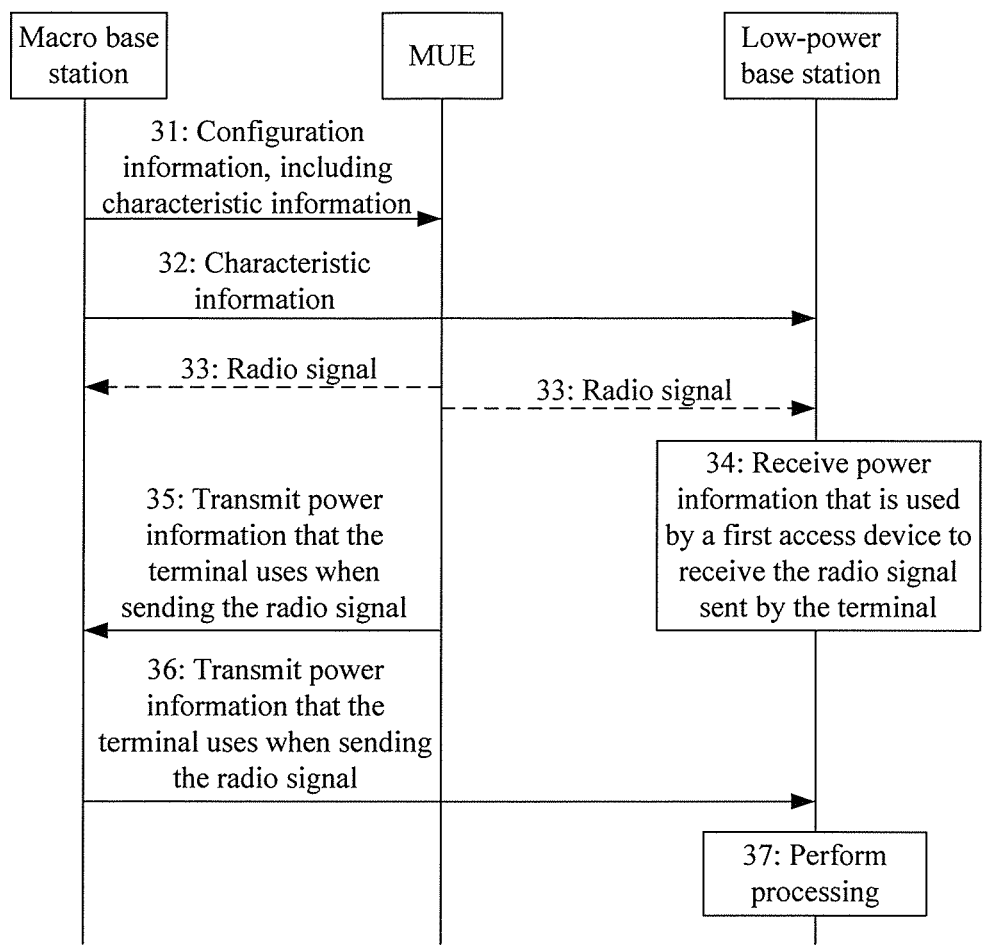
FIG. 3 is a schematic flowchart of another embodiment of an uplink detection-based processing method according to the present application.

FIG. 3 is a schematic flowchart of another embodiment of an uplink detection-based processing method according to the present application. That a low-power base station performs processing is used as an example in this embodiment. This embodiment includes:

Step 31. A macro base station sends a configuration message to an MUE (UL transmission configuration), where the configuration message carries characteristic information of the MUE.

The characteristic information may include:

a cell identity;

a terminal identifier; and a configuration message that is configured by a second access device for a terminal to send a radio signal.

Optionally, the configuration message that is configured by the second access device for the terminal to send the radio signal includes at least one of the following:

time domain resource information, frequency domain resource information, code domain resource information, and space domain resource information.

Step 32. The macro base station exchanges the characteristic information with the low-power base station (UL transmission configuration transfer).

The low-power base station may learn characteristic information of each MUE by exchanging a configuration message, and then, when a radio signal is detected, may determine, according to characteristic information corresponding to the radio signal, the MUE from which the radio signal comes.

Step 33. The MUE sends a radio signal according to the characteristic information (UL transmission).

Using an LTE system as an example, it is assumed that the radio signal sent by the MUE is a sounding (sounding) signal, characteristic information of the sounding signal is time-frequency resource location information, a sequence circular shift manner, and the like. Then, when performing configuration, the macro base station may send, to the MUE, the time-frequency resource location information, the sequence circular shift manner, and the like that are corresponding to the sounding signal, and then the MUE sends the sounding signal at a corresponding time-frequency resource location according to the corresponding sequence circular shift manner.

Alternatively, the radio signal sent by the MUE may be a random access channel (Random Access Channel, RACH) signal, and characteristic information corresponding to the RACH signal includes a time domain location, a random access preamble sequence, and the like. Therefore, when performing configuration, the macro base station may send, to the MUE, the time domain location, the random access preamble sequence, and the like that are corresponding to the RACH signal, and then the MUE sends the RACH signal at the corresponding time domain location according to the corresponding random access preamble sequence.

Step 34. The low-power base station detects, according to the characteristic information, the radio signal sent by the MUE, and obtains receive power information that is used by a first access device to receive the radio signal sent by a terminal (UL detection).

For example, the MUE sends the radio signal at a time-frequency resource location configured by the macro base station; and the low-power base station may listen to an uplink signal at the time-frequency resource location, performs power detection on the uplink signal obtained by listening, so as to obtain the receive power information that is used by the first access device to receive the radio signal sent by the terminal.

Step 35. The MUE sends, to the macro base station, transmit power information that the terminal uses when sending the radio signal (transmission power indication).

A time sequence for performing step 35 and step 34 is not limited.

Step 36. The macro base station sends, to the low-power base station, the transmit power information that is reported by the MUE and the terminal uses when sending the radio signal (transmission power notification).

A time sequence for performing step 36 and step 34 is not limited.

Step 37. The low-power base station performs processing according to the receive power information that is obtained by detection and is used by the first access device to receive the radio signal sent by the terminal, and the transmit power information that is sent by the macro base station and the terminal uses when sending the radio signal.

The processing includes: determining path loss between the terminal and the first access device according to the transmit power information that the terminal uses when sending the radio signal and the receive power information that is used by the first access device to receive the radio signal sent by the terminal. For example, the low-power base station determines that a difference value between the transmit power information that the terminal uses when sending the radio signal and the receive power information that is used by the first access device to receive the radio signal sent by the terminal is the path loss, or corrects the foregoing difference value according to a set policy and then determines a corrected difference value as the path loss. In this case, in a calculation manner in which a subtraction manner is used to obtain the path loss, both the transmit power information that the terminal uses when sending the radio signal and the receive power information that is used by the first access device to receive the radio signal sent by the terminal use a decibel (dB) as a unit.

Alternatively, after determining the path loss, the low-power base station determines, according to the path loss, that the MUE is served by the low-power base station; for example, when the path loss is less than a set threshold, the low-power base station determines that the low-power base station serves the MUE.

Alternatively, a transmitter of the low-power base station is started according to the transmit power information that the terminal uses when sending the radio signal and the receive power information that is used by the first access device to receive the radio signal sent by the terminal; for example, the path loss is determined according to the transmit power information that the terminal uses when sending the radio signal and the receive power information that is used by the first access device to receive the radio signal sent by the terminal, and when the number of MUEs with path loss less than a set threshold is less than a set value, the transmitter is started.

By performing the foregoing processing, the following applications may be implemented: in an SON scenario, whether to awaken a corresponding low-power base station may be determined according to the number of terminals in coverage of the low-power base station. For example, when the number of terminals in the coverage of the low-power base station reaches a set threshold, the low-power base station is awakened, so as to avoid a waste of energy caused by awakening the low-power base station when no UE or no data service exists or only a small number of low-power base stations or little data services exist in the coverage of the low-power base station. Whether an MUE falls within the coverage of the low-power base station may be determined according to path loss between the MUE and the low-power base station. When the path loss is less than a set value, it may be determined that the MUE falls within the coverage of the low-power base station.

Alternatively, in an uplink-downlink separation scenario, an appropriate cell may be selected according to path loss between an MUE and a low-power base station. For example, a low-power base station with a relatively small path loss is selected to provide an uplink access service for a terminal.

In this embodiment, the terminal sends, to the macro base station, the transmit power information that the terminal uses when sending the radio signal. Optionally, the terminal may also not report the transmit power information that the terminal uses when sending the radio signal, but sends measurement information to the macro base station, the macro base station obtains the transmit power information, which the terminal uses when sending the radio signal, by calculating according to the measurement information, transmit power information of the second access device, and receive power information that is used by the second access device to receive the radio signal sent by the terminal, and then the macro base station sends, to the low-power base station, the transmit power information that is obtained by calculation and the terminal uses when sending the radio signal; or the terminal sends measurement information to the macro base station, and then, the macro base station sends, to the low-power base station, the measurement information, transmit power information of the second access device, and receive power information that is used by the second access device to receive the radio signal sent by the terminal, so that the low-power base station obtains the transmit power information, which the terminal uses when sending the radio signal, by calculating according to the measurement information, the transmit power information of the second access device, and the receive power information that is used by the second access device to receive the radio signal sent by the terminal.

The obtaining the transmit power information, which the terminal uses when sending the radio signal, by calculating according to the measurement information, the transmit power information of the second access device, and the receive power information that is used by the second access device to receive the radio signal sent by the terminal may include: for example, the measurement information is reference signal receive power, and the transmit power information of the second access device is reference signal transmit power, obtaining path loss between the second access device and the terminal by subtracting the reference signal receive power from the reference signal transmit power, and adding the path loss between the second access device and the terminal to the receive power information that is used by the second access device to receive the radio signal sent by the terminal, to obtain the transmit power information that the terminal uses when sending the radio signal.

Optionally, the terminal may also neither report the transmit power information that the terminal uses when sending the radio signal, nor report the measurement information. Instead, the macro base station obtains the transmit power information, which the terminal uses when sending the radio signal, by calculating according to the receive power information that is used by the second access device to receive the radio signal sent by the terminal and information about the path loss from the second access device to the terminal, and then the macro base station sends, to the low-power base station, the transmit power information that the terminal uses when sending the radio signal; or the macro base station sends, to the low-power base station, the receive power information that is used by the second access device to receive the radio signal sent by the terminal and information about the path loss from the second access device to the terminal, and the low-power base station obtains the transmit power information, which the terminal uses when sending the radio signal, by calculating according to the receive power information that is used by the second access device to receive the radio signal sent by the terminal and the information about the path loss from the second access device to the terminal.

In addition, that the macro base station sends, to the low-power base station, the transmit power information that the terminal uses when sending the radio signal, or the measurement information, or the receive power information that is used by the second access device to receive the radio signal sent by the terminal, and the information about the path loss from the second access device to the terminal may be that: the macro base station directly sends the foregoing information to the low-power base station; or the macro base station sends the foregoing information to a network entity, and the network entity sends the foregoing information to the low-power base station. Similarly, sending that is not specially described in this embodiment of the present application may refer to direct sending or forwarding by using another device.

In this embodiment, a low-power base station acquires related information and performs processing, so as to implement uplink detection-based processing, which may further provide a basis for subsequent awakening or uplink cell selection.

Figure 4:
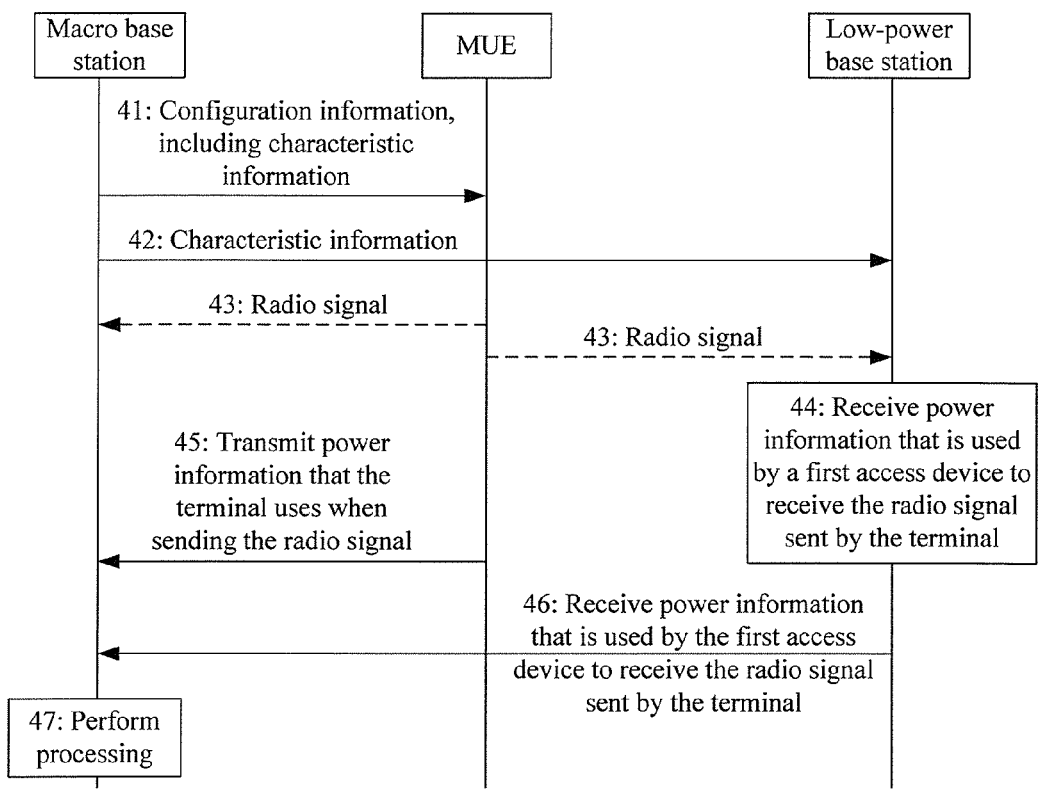
FIG. 4 is a schematic flowchart of another embodiment of an uplink detection-based processing method according to the present application.

FIG. 4 is a schematic flowchart of another embodiment of an uplink detection-based processing method according to the present application. That a macro base station performs processing is used as an example in this embodiment. This embodiment includes:

Step 41. The macro base station sends a configuration message (UL transmission configuration) to an MUE.

Step 42. The macro base station exchanges characteristic information with a low-power base station (UL transmission configuration transfer).

Step 43. The MUE sends a radio signal according to the configuration message (UL transmission).

Step 44. The low-power base station detects, according to the characteristic information, the radio signal sent by the MUE, and obtains receive power information that is used by a first access device to receive the radio signal sent by a terminal (UL detection).

Step 45. The MUE sends, to the macro base station, transmit power information that the terminal uses when sending the radio signal (transmission power indication).

For specific content of steps 41 to 45, refer to steps 31 to 35.

Step 46. The low-power base station sends, to the macro base station, the receive power information that is used by the first access device to receive the radio signal sent by the terminal.

Step 47. The macro base station performs processing according to the receive power information that is sent by the low-power base station and is used by the first access device to receive the radio signal sent by the terminal, and the transmit power information that is sent by the MUE and the terminal uses when sending the radio signal.

For specific content and subsequent application content of processing according to the receive power information that is used by the first access device to receive the radio signal sent by the terminal and the transmit power information that the terminal uses when sending the radio signal, refer to content corresponding to FIG. 3, and details are not repeatedly described herein.

In this embodiment, the terminal sends, to the macro base station, the transmit power information that the terminal uses when sending the radio signal. Optionally, the terminal may not report the transmit power information that the terminal uses when sending the radio signal, but sends measurement information to the macro base station; and the macro base station obtains the transmit power information by calculating according to the measurement information, transmit power information of a second access device, and receive power information that is used by the second access device to receive the radio signal sent by the terminal.

For details about obtaining the transmit power information, which the terminal uses when sending the radio signal, by calculating according to the measurement information, the transmit power information of the second access device, and the receive power information that is used by the second access device to receive the radio signal sent by the terminal, refer to the foregoing embodiment.

Optionally, the terminal may neither report the transmit power information that the terminal uses when sending the radio signal, nor report the measurement information. Instead, the macro base station obtains the transmit power information, which the terminal uses when sending the radio signal, by calculating according to the receive power information that is used by the second access device to receive the radio signal sent by the terminal and information about path loss from the second access device to the terminal.

In addition, that the low-power base station sends, to the macro base station, the receive power information that is used by the first access device to receive the radio signal sent by the terminal may be that: the low-power base station directly sends, to the macro base station, the receive power information that is used by the first access device to receive the radio signal sent by the terminal; or the low-power base station sends, to a network entity, the receive power information that is used by the first access device to receive the radio signal sent by the terminal, and the network entity further sends, to the macro base station, the receive power information that is used by the first access device to receive the radio signal sent by the terminal.

In this embodiment, a macro base station acquires related information and performs processing, so as to implement uplink detection-based processing, which may further provide a basis for subsequent awakening or uplink cell selection.

Figure 5:
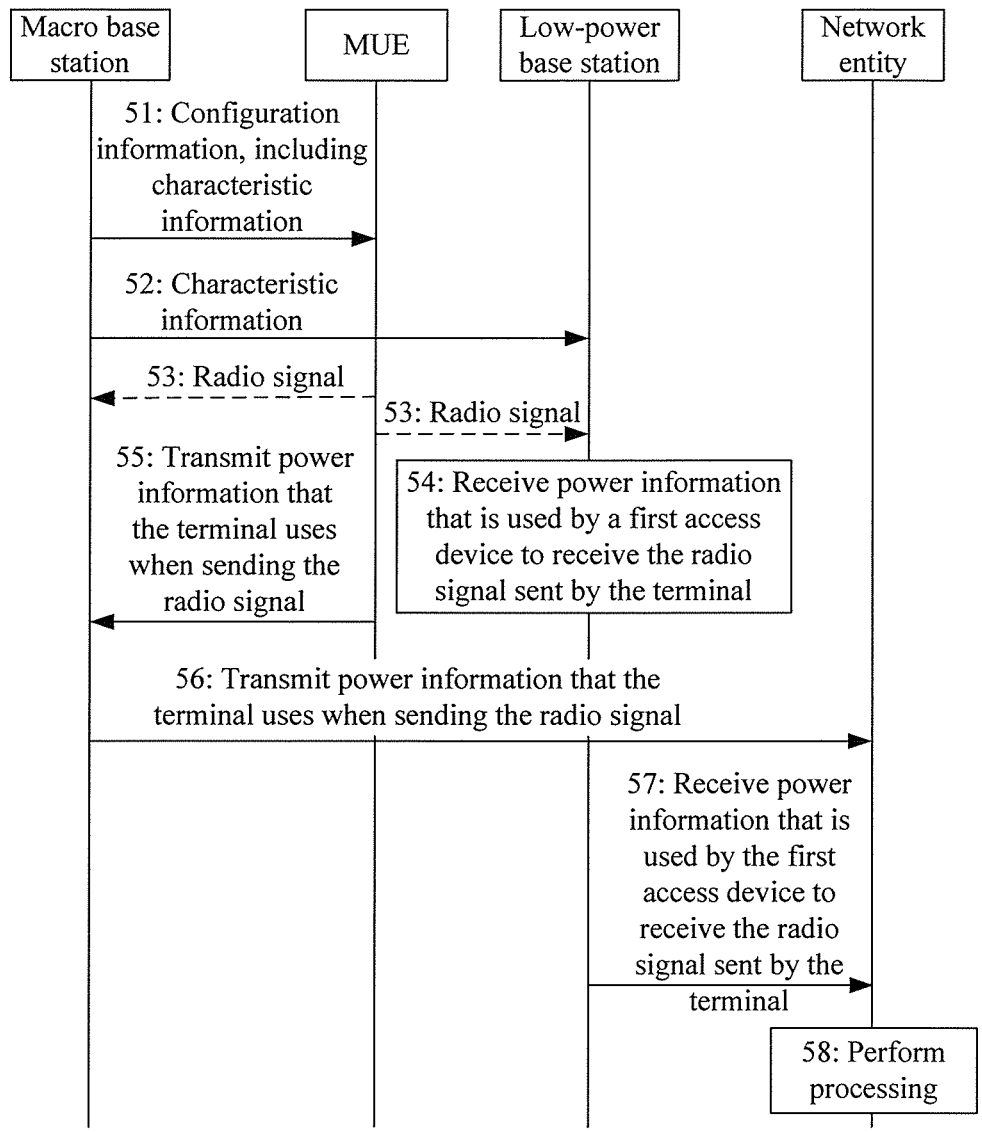
FIG. 5 is a schematic flowchart of another embodiment of an uplink detection-based processing method according to the present application.

FIG. 5 is a schematic flowchart of another embodiment of an uplink detection-based processing method according to the present application. That a network entity different from a macro base station and a low-power base station performs processing is used as an example. This embodiment includes:

Step 51. The macro base station sends a configuration message (UL transmission configuration) to an MUE.

Step 52. The macro base station exchanges characteristic information with the low-power base station (UL transmission configuration transfer).

Step 53. The MUE performs uplink transmission according to the configuration message (UL transmission).

Step 54. The low-power base station detects, according to the characteristic information, a radio signal sent by the MUE, and obtains receive power information that is used by a first access device to receive the radio signal sent by the terminal (UL detection).

Step 55. The MUE sends, to the macro base station, transmit power information that the terminal uses when sending the radio signal (transmission power indication).

For specific content of steps 51 to 55, refer to steps 31 to 35.

Step 56. The macro base station sends, to the network entity, the transmit power information that the terminal uses when sending the radio signal.

Step 57. The low-power base station sends, to the same network entity, the receive power information that is used by the first access device to receive the radio signal sent by the terminal.

A time sequence for performing step 56 and step 57 is not limited.

Step 58. The network entity performs processing according to the receive power information that is sent by the low-power base station and is used by the first access device to receive the radio signal sent by the terminal, and the transmit power information that is sent by the macro base station and the terminal uses when sending the radio signal.

For specific content and subsequent application content of processing according to the receive power information that is used by the first access device to receive the radio signal sent by the terminal and the transmit power information that the terminal uses when sending the radio signal, refer to content corresponding to FIG. 3, and details are not repeatedly described herein.

In this embodiment, the terminal sends, to the macro base station, the transmit power information that the terminal uses when sending the radio signal.

Optionally, the terminal may not report the transmit power information that the terminal uses when sending the radio signal, but sends measurement information to the macro base station, the macro base station obtains the transmit power information, which the terminal uses when sending the radio signal, by calculating according to the measurement information, transmit power information of the second access device, and receive power information that is used by the second access device to receive the radio signal sent by the terminal, and then the macro base station sends, to the network entity, the transmit power information that is obtained by calculation and the terminal uses when sending the radio signal; or the terminal sends measurement information to the macro base station, and then, the macro base station sends, to the network entity, the measurement information, transmit power information of the second access device, and receive power information that is used by the second access device to receive the radio signal sent by the terminal, so that the network entity obtains the transmit power information by calculating according to the measurement information, the transmit power information of the second access device, and the receive power information that is used by the second access device to receive the radio signal sent by the terminal.

The obtaining the transmit power information, which the terminal uses when sending the radio signal, by calculating according to the measurement information, the transmit power information of the second access device, and the receive power information that is used by the second access device to receive the radio signal sent by the terminal may include: for example, the measurement information is reference signal receive power, and the transmit power information of the second access device is reference signal transmit power, obtaining path loss between the second access device and the terminal by subtracting the reference signal receive power from the reference signal transmit power, and adding the path loss between the second access device and the terminal to the receive power information that is used by the second access device to receive the radio signal sent by the terminal, to obtain the transmit power information that the terminal uses when sending the radio signal.

Optionally, the terminal may neither report the transmit power information that the terminal uses when sending the radio signal, nor report the measurement information. Instead, the macro base station obtains the transmit power information, which the terminal uses when sending the radio signal, by calculating according to the receive power information that is used by the second access device to receive the radio signal sent by the terminal and information about the path loss from the second access device to the terminal, and then the macro base station sends, to the network entity, the transmit power information that the terminal uses when sending the radio signal; or the macro base station sends, to the network entity, the receive power information that is used by the second access device to receive the radio signal sent by the terminal and information about the path loss from the second access device to the terminal, and the network entity obtains the transmit power information, which the terminal uses when sending the radio signal, by calculating according to the receive power information that is used by the second access device to receive the radio signal sent by the terminal and the information about the path loss from the second access device to the terminal.

In this embodiment, a network entity acquires related information and performs processing, so as to implement uplink detection-based processing, which may further provide a basis for subsequent awakening or uplink cell selection.

Figure 6:
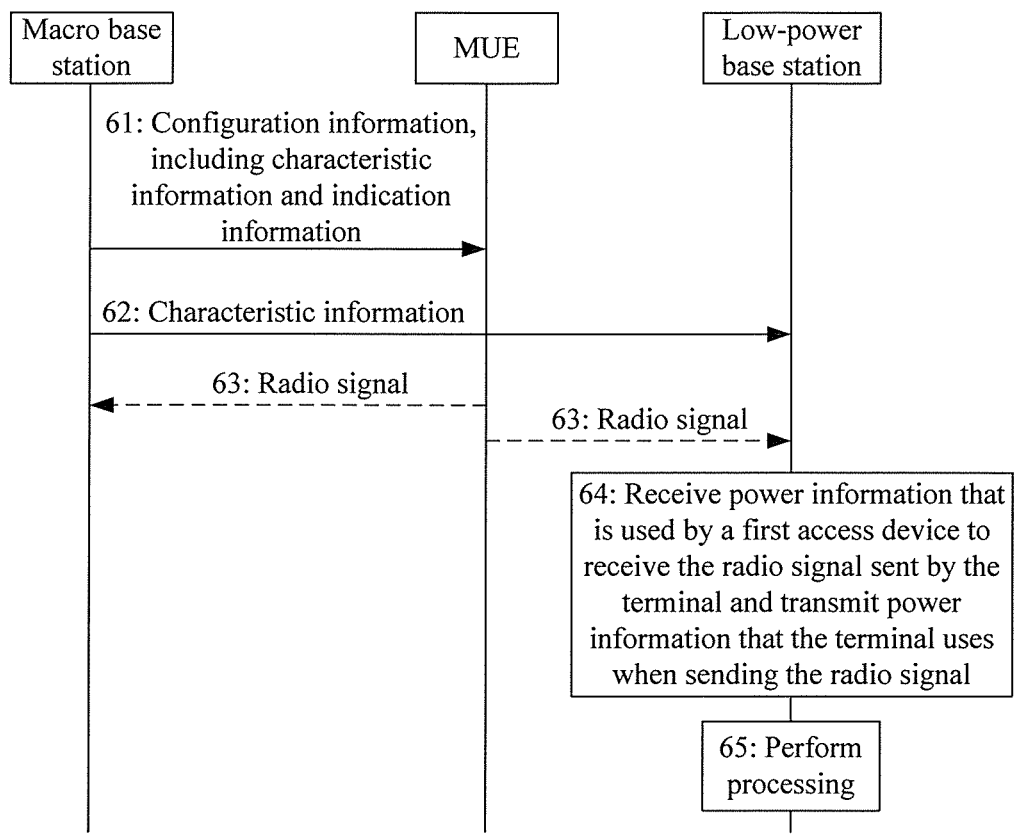
FIG. 6 is a schematic flowchart of another embodiment of an uplink detection-based processing method according to the present application.

FIG. 6 is a schematic flowchart of another embodiment of an uplink detection-based processing method according to the present application. A difference between this embodiment and the foregoing embodiment lies in that: in this embodiment, transmit power information that a terminal uses when sending a radio signal may be determined according to a radio signal sent by an MUE, and the transmit power information that the terminal uses when sending the radio signal does not need to be separately sent. This embodiment includes:

Step 61. A macro base station sends a configuration message to the MUE, where the configuration message carries characteristic information of the MUE and radio signal information allocated to the MUE (UL transmission configuration).

A correspondence exists between the radio signal and transmit power information that the terminal uses when sending the radio signal. For example, in an LTE system, there are multiple pseudorandom sequence signals, which may be grouped into several groups, where at least one pseudorandom sequence signal in each group is used for uplink transmission. Different transmit power is used when pseudorandom sequence signals in different groups are transmitted. Then, after a low-power base station detects the pseudorandom sequence signal, the transmit power information that the terminal uses when sending the radio signal may be determined according to a group to which the pseudorandom sequence signal belongs. For example, group 1 corresponds to transmit power 1, and group 2 corresponds to transmit power 2. If the detected pseudorandom sequence signal belongs to group 1, it can be determined that the transmit power information that the terminal uses when sending the radio signal is transmit power 1.

Step 62. The macro base station exchanges characteristic information with a low-power base station (UL transmission configuration transfer).

Step 63. The MUE sends the radio signal according to the configuration message (UL transmission).

For example, the MUE determines to send a radio signal according to transmit power 1, and correspondingly a pseudorandom sequence signal in group 1 is selected for sending. Then, the MUE may send a pseudorandom sequence signal for uplink transmission in group 1 by using transmit power 1.

Step 64. The low-power base station detects, according to the characteristic information, the radio signal sent by the MUE, obtains receive power information that is used by a first access device to receive the radio signal sent by a terminal, and determines, according to a correspondence between the detected radio signal and transmit power information, transmit power information that the terminal uses when sending the radio signal.

Step 65. The low-power base station performs processing according to the receive power information that is used by the first access device to receive the radio signal sent by the terminal and the transmit power information that the terminal uses when sending the radio signal.

For specific content and subsequent application content of processing according to the receive power information that is used by the first access device to receive the radio signal sent by the terminal and the transmit power information that the terminal uses when sending the radio signal, refer to content corresponding to FIG. 3, and details are not repeatedly described herein.

In this embodiment, processing performed by a low-power base station is used as an example, or processing may be performed by a macro base station or a network entity.

Optionally, when foregoing processing is performed by the macro base station, that is, when the network device is the second access device, the second access device determines, according to the received radio signal, the transmit power information that the terminal uses when sending the radio signal; or when the network device is the network entity, the network entity receives the transmit power information that is determined by the first access device or the second access device and the terminal uses when sending the radio signal; or the network entity receives radio signal information sent by the first access device or the second access device, and determines, according to the correspondence and the radio signal information, the transmit power information that the terminal uses when sending the radio signal.

In addition, the foregoing correspondence between the radio signal and the transmit power information may be predetermined by a network side and a terminal side, or be configured by the macro base station for another device, such as the MUE, the low-power base station, or the network entity.

In this embodiment, an MUE sends a radio signal, and a correspondence exists between the radio signal and transmit power information; and a network device may determine, according to the radio signal, transmit power information that a terminal uses when sending the radio signal, that is, may perform processing according to the transmit power information that the terminal uses when sending the radio signal and receive power information that is used by a first access device to receive the radio signal sent by the terminal, which may further provide a basis for subsequent awakening or uplink cell selection.

Figure 7:
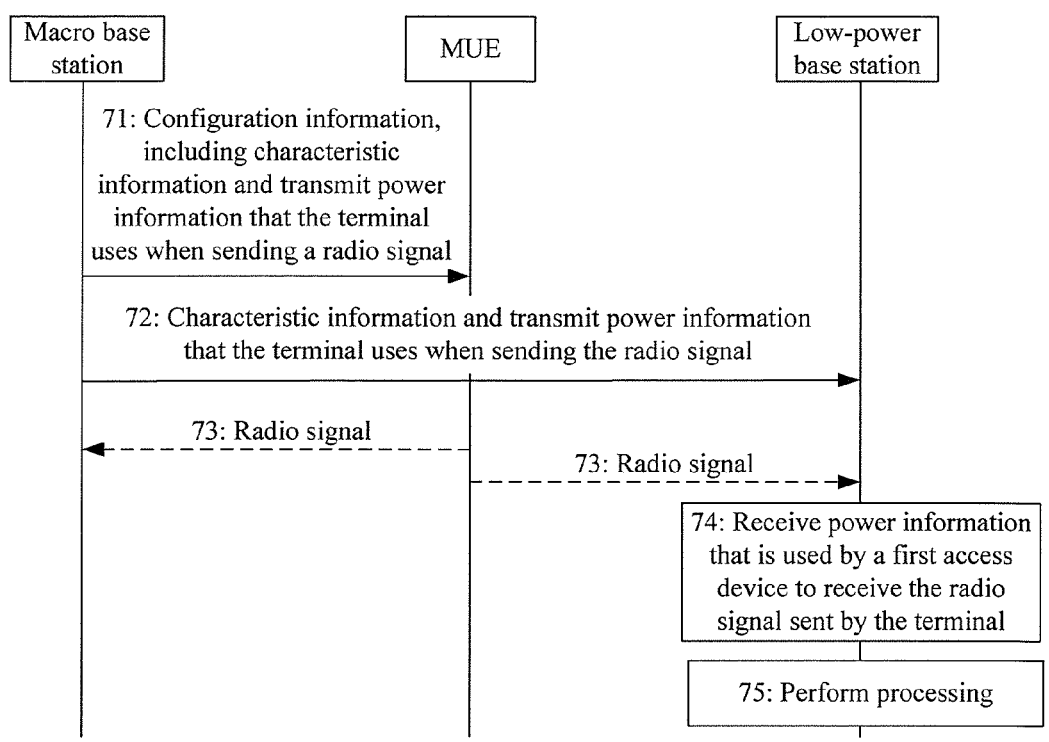
FIG. 7 is a schematic flowchart of another embodiment of an uplink detection-based processing method according to the present application.

FIG. 7 is a schematic flowchart of another embodiment of an uplink detection-based processing method according to the present application. In this embodiment, transmit power information that an MUE uses when sending a radio signal is configured by a macro base station. This embodiment includes:

Step 71. The macro base station sends a configuration message (UL transmission configuration) to the MUE.

The configuration message carries characteristic information of the MUE and transmit power information that a terminal uses when sending a radio signal.

Step 72. The macro base station exchanges, with a low-power base station, the characteristic information and transmit power information that a terminal uses when sending a radio signal (UL transmission configuration transfer).

The low-power base station may determine, by means of exchange, the transmit power information that the terminal uses when sending the radio signal and the characteristic information of the MUE.

Step 73. The MUE sends the radio signal according to the transmit power information that the terminal uses when sending the radio signal, and the characteristic information that are carried in the configuration message (UL transmission).

Step 74. The low-power base station detects, according to the characteristic information, the radio signal sent by the MUE, and obtains receive power information that is used by a first access device to receive the radio signal sent by the terminal (UL detection).

Step 75. The low-power base station performs processing according to the receive power information that is obtained by detection and is used by the first access device to receive the radio signal sent by the terminal, and the transmit power information that the terminal uses when sending the radio signal and is acquired at the time of exchange between the low-power base station and the macro base station.

For specific content and subsequent application content of processing according to the receive power information that is used by the first access device to receive the radio signal sent by the terminal and the transmit power information that the terminal uses when sending the radio signal, refer to content corresponding to FIG. 3, and details are not repeatedly described herein.

In this embodiment, processing performed by a low-power base station is used as an example, or processing may be performed by a macro base station or a network entity.

Optionally, when foregoing processing is performed by the macro base station, the low-power base station may send, to the macro base station, the receive power information that is used by the first access device to receive the radio signal sent by the terminal, and the macro base station performs processing according to the transmit power information that is configured by the macro base station for the MUE and the terminal uses when sending the radio signal, and the receive power information that is sent by the low-power base station and is used by the first access device to receive the radio signal sent by the terminal.

Optionally, when foregoing processing is performed by the network entity, the low-power base station may send, to the macro base station, the determined receive power information that is used by the first access device to receive the radio signal sent by the terminal, the macro base station may send, to the network entity, the transmit power information that is configured for the MUE and the terminal uses when sending the radio signal, and the network entity performs processing according to the received transmit power information that the terminal uses when sending the radio signal and the receive power information that is used by the first access device to receive the radio signal sent by the terminal.

In this embodiment, a macro base station configures, for an MUE, transmit power information that a terminal uses when sending a radio signal. A network side may acquire, according to a configuration of the macro base station, the transmit power information that the terminal uses when sending the radio signal. After acquiring receive power information that is used by a first access device to receive the radio signal sent by the terminal, a low-power base station may perform processing according to the transmit power information that the terminal uses when sending the radio signal and the receive power information that is used by the first access device to receive the radio signal sent by the terminal, so as to implement uplink detection-based processing, which may further provide a basis for subsequent awakening or uplink cell selection.

Figure 8:
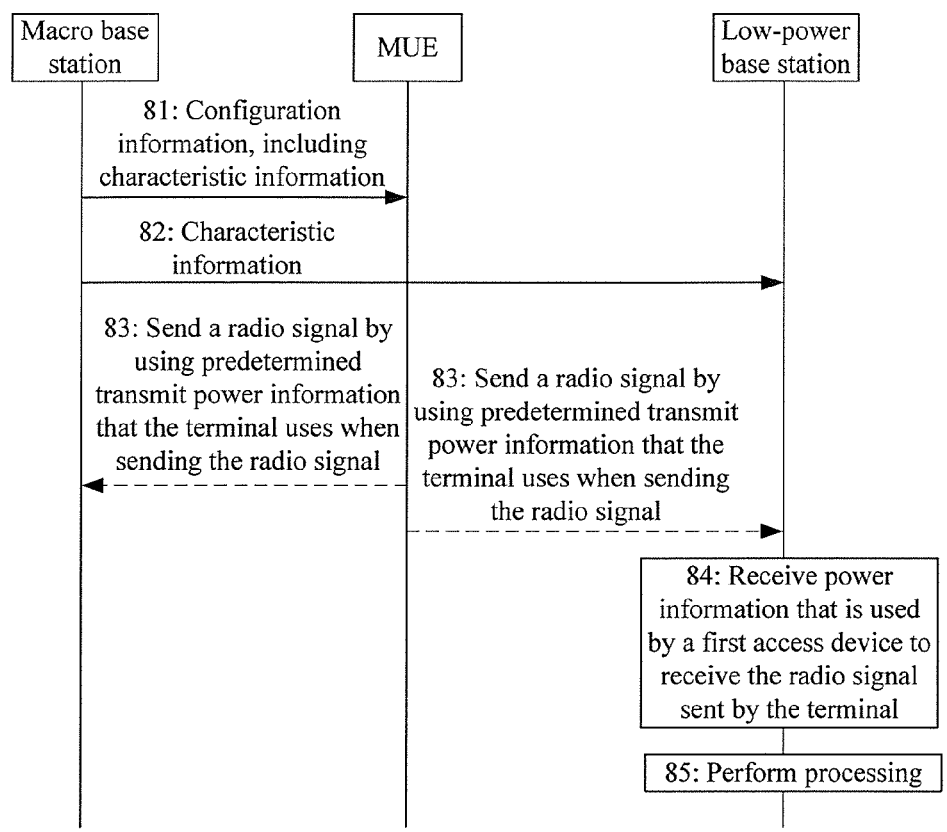
FIG. 8 is a schematic flowchart of another embodiment of an uplink detection-based processing method according to the present application.

FIG. 8 is a schematic flowchart of another embodiment of an uplink detection-based processing method according to the present application. In this embodiment, transmit power information is predetermined by a network side and a terminal side. This embodiment includes:

Step 81. A macro base station sends a configuration message to an MUE, where the configuration message carries characteristic information of the MUE (UL transmission configuration).

Step 82. The macro base station exchanges the characteristic information with a low-power base station (UL transmission configuration transfer).

Step 83. The MUE sends a radio signal by using the predetermined transmit power information that a terminal uses when sending the radio signal.

Step 84. The low-power base station detects, according to the characteristic information, the radio signal sent by the MUE, and obtains receive power information that is used by a first access device to receive the radio signal sent by the terminal (UL detection).

For specific content of steps 81 to 84, refer to steps 31 to 34.

Step 85. The low-power base station performs processing according to the predetermined transmit power information that the terminal uses when sending the radio signal and the obtained receive power information that is used by the first access device to receive the radio signal sent by the terminal.

For specific content and application content of processing according to the receive power information that is used by the first access device to receive the radio signal sent by the terminal and the transmit power information that the terminal uses when sending the radio signal, refer to content corresponding to FIG. 3, and details are not repeatedly described herein.

In this embodiment, processing performed by a low-power base station is used as an example, or processing may be performed by a macro base station or a network entity.

Optionally, when performed by the macro base station, the low-power base station sends, to the macro base station, the receive power information that is used by the first access device to receive the radio signal sent by the terminal; and the macro base station performs processing according to the predetermined transmit power information that the terminal uses when sending the radio signal and the receive power information that is used by the first access device to receive the radio signal sent by the terminal.

Optionally, when performed by the network entity, the low-power base station sends, to the network entity, the receive power information that is used by the first access device to receive the radio signal sent by the terminal; and the network entity performs processing according to the predetermined transmit power information that the terminal uses when sending the radio signal and the receive power information that is used by the first access device to receive the radio signal sent by the terminal.

In this embodiment, a predetermining manner is used, so that each device acquires transmit power information that a terminal uses when sending a radio signal. After determining receive power information that is used by a first access device to receive the radio signal sent by the terminal, a low-power base station performs processing according to the transmit power information that the terminal uses when sending the radio signal and the receive power information that is used by the first access device to receive the radio signal sent by the terminal, so as to implement uplink detection-based processing, which may further provide a basis for subsequent awakening or uplink cell selection.

Figure 9:
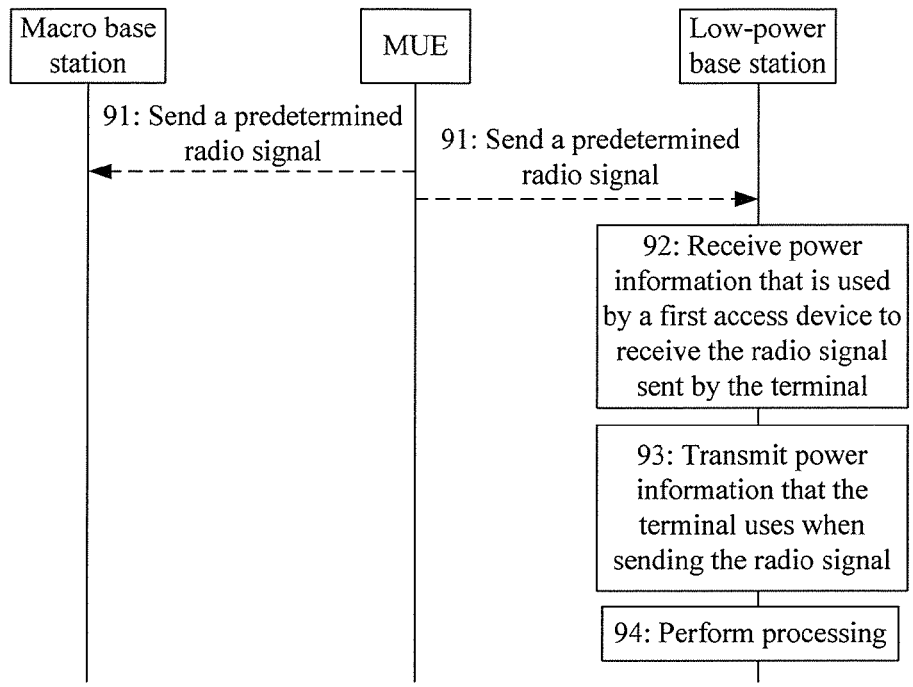
FIG. 9 is a schematic flowchart of another embodiment of an uplink detection-based processing method according to the present application.

FIG. 9 is a schematic flowchart of another embodiment of an uplink detection-based processing method according to the present application. In this embodiment, a radio signal is predetermined by a network side and a terminal side. This embodiment includes:

Step 91. An MUE sends the predetermined radio signal.

Step 92. A low-power base station detects the predetermined radio signal, and determines receive power information that is used by a first access device to receive the radio signal sent by a terminal.

Step 93. The low-power base station acquires transmit power information that the terminal uses when sending the radio signal.

Optionally, the low-power base station may acquire, in any one of the following manners, the transmit power information that the terminal uses when sending the radio signal:

the MUE reports, to a macro base station, the transmit power information that the terminal uses when sending the radio signal, and then the macro base station sends, to the low-power base station, the transmit power information that the terminal uses when sending the radio signal;

the MUE reports measurement information to a macro base station; and the macro base station obtains the transmit power information, which the terminal uses when sending the radio signal, by calculating according to the measurement information, receive power information that is used by a second access device to receive the radio signal sent by the terminal, and transmit power information of the second access device, and sends, to the low-power base station, the transmit power information that the terminal uses when sending the radio signal;

the MUE reports measurement information to a macro base station, and then the macro base station sends, to the low-power base station, the measurement information, receive power information that is used by a second access device to receive the radio signal sent by the terminal, and transmit power information of the second access device, so that the low-power base station obtains the transmit power information, which the terminal uses when sending the radio signal, by calculating according to the measurement information, the receive power information that is used by the second access device to receive the radio signal sent by the terminal, and the transmit power information of the second access device;

a macro base station obtains the transmit power information, which the terminal uses when sending the radio signal, by calculating according to receive power information that is used by a second access device to receive the radio signal sent by the terminal and information about path loss from the second access device to the terminal, and sends, to the low-power base station, the transmit power information that the terminal uses when sending the radio signal;

a macro base station sends, to the low-power base station, receive power information that is used by a second access device to receive the radio signal sent by the terminal, and information about path loss from the second access device to the terminal, and the low-power base station obtains the transmit power information, which the terminal uses when sending the radio signal, by calculating according to the receive power information that is used by a second access device to receive the radio signal sent by the terminal and the information about the path loss from the second access device to the terminal;

the low-power base station determines, according to a correspondence between a radio signal and transmit power information, and the received radio signal, the transmit power information that the terminal uses when sending the radio signal;

the transmit power information that the terminal uses when sending the radio signal is transmit power information that is predetermined by the network side and the terminal side and the terminal uses when sending the radio signal; and the transmit power information that the terminal uses when sending the radio signal is configured by a macro base station for the MUE and sent by the macro base station to the low-power base station.

Step 94. The low-power base station performs processing according to the transmit power information that the terminal uses when sending the radio signal and the receive power information that is used by the first access device to receive the radio signal sent by the terminal.

For specific content and subsequent application content of processing according to the receive power information that is used by the first access device to receive the radio signal sent by the terminal and the transmit power information that the terminal uses when sending the radio signal, refer to content corresponding to FIG. 3, and details are not repeatedly described herein.

In this embodiment, processing performed by a low-power base station is used as an example, or processing may be performed by a macro base station or a network entity.

Optionally, when performed by the macro base station, the low-power base station sends receive power information to the macro base station; and the macro base station determines transmit power information in any one of the following manners, and then performs processing according to the transmit power information and the receive power information:

the MUE reports the transmit power information to the macro base station;

the MUE reports measurement information to the macro base station, and the macro base station obtains the transmit power information, which the terminal uses when sending the radio signal, by calculating according to the measurement information, receive power information that is used by a second access device to receive the radio signal sent by the terminal, and transmit power information of the second access device;

the macro base station determines, according to a correspondence between a radio signal and transmit power information, and the received radio signal, the transmit power information that the terminal uses when sending the radio signal;

the transmit power information that the terminal uses when sending the radio signal is transmit power information that is predetermined by the network side and the terminal side;

the transmit power information that the terminal uses when sending the radio signal is configured by the macro base station for the MUE, and, as configured by the macro base station, may be learned by the macro base station; and the macro base station obtains the transmit power information, which the terminal uses when sending the radio signal, by calculating according to receive power information that is used by a second access device to receive the radio signal sent by the terminal and information about path loss from the second access device to the terminal.

Optionally, when performed by the network entity, the low-power base station sends, to the network entity, the receive power information that is used by the first access device to receive the radio signal sent by the terminal; and the network entity determines, in any one of the following manners, the transmit power information that the terminal uses when sending the radio signal, and then performs processing according to the transmit power information that the terminal uses when sending the radio signal and the receive power information that is used by the first access device to receive the radio signal sent by the terminal:

the MUE reports, to the macro base station, the transmit power information that the terminal uses when sending the radio signal, and then the macro base station sends, to the network entity, the transmit power information that the terminal uses when sending the radio signal;

the MUE reports measurement information to the macro base station, and the macro base station obtains the transmit power information, which the terminal uses when sending the radio signal, by calculating according to the measurement information, receive power information that is used by a second access device to receive the radio signal sent by the terminal, and transmit power information of the second access device, and sends, to the network entity, the transmit power information that the terminal uses when sending the radio signal;

the MUE reports measurement information to the macro base station, and then the macro base station sends, to the network entity, the measurement information, receive power information that is used by a second access device to receive the radio signal sent by the terminal, and transmit power information of the second access device, so that the network entity obtains the transmit power information, which the terminal uses when sending the radio signal, by calculating according to the measurement information, the receive power information that is used by the second access device to receive the radio signal sent by the terminal, and the transmit power information of the second access device;

the network entity receives the transmit power information that is sent by the macro base station or the low-power base station and the terminal uses when sending the radio signal, where the transmit power information that the terminal uses when sending the radio signal is determined by the macro base station or the low-power base station according to a correspondence between a radio signal and transmit power information, and the received radio signal;

the network entity receives the radio signal sent by the macro base station or the low-power base station, and the network entity determines, according to a correspondence between a radio signal and transmit power information, and the received radio signal, the transmit power information that the terminal uses when sending the radio signal;

the transmit power information that the terminal uses when sending the radio signal is transmit power information that is predetermined by the network side and the terminal side and the ten final uses when sending the radio signal;

the transmit power information that the terminal uses when sending the radio signal is configured by the macro base station for the MUE, and is sent by the macro base station to the network entity;

the macro base station obtains the transmit power information, which the terminal uses when sending the radio signal, by calculating according to receive power information that is used by a second access device to receive the radio signal sent by the terminal and information about path loss from the second access device to the terminal, and sends, to the network entity, the transmit power information that the terminal uses when sending the radio signal; and the macro base station sends, to the network entity, receive power information that is used by a second access device to receive the radio signal sent by the terminal, and information about path loss from the second access device to the terminal; and the network entity obtains the transmit power information, which the terminal uses when sending the radio signal, by calculating according to the receive power information that is used by the second access device to receive the radio signal sent by the terminal and the information about the path loss from the second access device to the terminal.

In this embodiment, a radio signal is predetermined, and uplink detection-based processing may be performed when no characteristic information is configured, which may further provide a basis for subsequent awakening or uplink cell selection.

Figure 10:
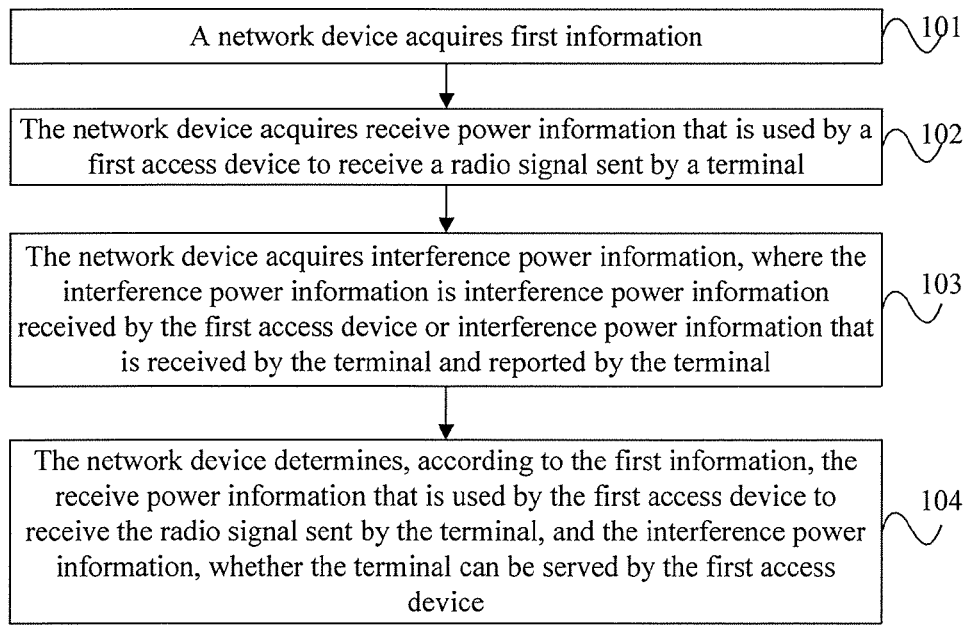
FIG. 10 is a schematic flowchart of another embodiment of an uplink detection-based processing method according to the present application.

FIG. 10 is a schematic flowchart of another embodiment of an uplink detection-based processing method according to the present application. In this embodiment, processing is performed according to both transmit power information and interference power information. This embodiment includes:

Step 101. A network device acquires first information, where the first information is transmit power information that a terminal uses when sending a radio signal; or the first information includes receive power information that is used by a second access device to receive the radio signal sent by the terminal and information about path loss from the second access device to the terminal; or the first information includes receive power information that is used by a second access device to receive the radio signal sent by the terminal, transmit power information of the second access device, and measurement information for the second access device obtained by the terminal.

Step 102. The network device acquires receive power information that is used by the first access device to receive the radio signal sent by the terminal.

Step 103. The network device acquires interference power information, where the interference power information is interference power information received by the first access device or interference power information that is received by the terminal and reported by the terminal.

Step 104. The network device determines, according to the first information, the receive power information that is used by the first access device to receive the radio signal sent by the terminal, and the interference power information, whether the terminal can be served by the first access device.

Optionally, step 104 may include:

when the interference power information is the interference power information received by the first access device, the network device determines signal quality according to the first information, the receive power information that is used by the first access device to receive the radio signal sent by the terminal, the interference power information received by the first access device, and transmit power information, which is used when the terminal is served by the first access device, of the terminal, and determines, according to the signal quality, whether the terminal can be served by the first access device; or the network device determines path loss between the terminal and the first access device according to the first information and the receive power information that is used by the first access device to receive the radio signal sent by the terminal; and the network device determines signal quality according to the first information, the receive power information that is used by the first access device to receive the radio signal sent by the terminal, the interference power information received by the first access device, and transmit power information, which is used when the terminal is served by the first access device, of the terminal, and determines, according to the path loss between the terminal and the first access device, and the signal quality, whether the terminal can be served by the first access device; or when the interference power information is the interference power information received by the terminal, the network device determines signal quality according to the first information, the receive power information that is used by the first access device to receive the radio signal sent by the terminal, the interference power information received by the terminal, and transmit power information, which is used when the terminal is served by the first access device, of the first access device, and determines, according to the signal quality, whether the terminal can be served by the first access device; or the network device determines path loss between the terminal and the first access device according to the first information and the receive power information that is used by the first access device to receive the radio signal sent by the terminal; and the network device determines signal quality according to the first information, the receive power information that is used by the first access device to receive the radio signal sent by the terminal, the interference power information received by the terminal, and transmit power information, which is used when the terminal is served by the first access device, of the first access device, and determines, according to the path loss between the terminal and the first access device, and the signal quality, whether the terminal can be served by the first access device.

The signal quality may be calculated as follows: It is assumed that the signal quality is a signal to interference plus noise ratio. Interference information is the interference power information received by the first access device, and signal information is a difference value between the transmit power information, which is used when the terminal is served by the first access device, of the terminal and the path loss between the first access device and the terminal. For a manner of calculating the path loss between the first access device and the terminal, refer to the foregoing embodiment, for example, the path loss between the terminal and the first access device is a difference value between the transmit power information that the terminal uses when sending the radio signal, and the receive power information that is used by the first access device to receive the radio signal sent by the terminal.

Optionally, when the network device is respectively the first access device, the second access device, or a network entity, for a manner of acquiring the receive power information and the transmit power information, refer to the foregoing description about a low-power base station, a macro base station, and a network entity, respectively, and details are not repeatedly described herein.

The interference power information may be acquired in the following manners:

When the interference power information is the interference power information received by the first access device, that the network device acquires the interference power information includes that:

when the network device is the first access device, the first access device determines the received interference power information; or when the network device is the second access device or the network entity, the second access device or the network entity receives the interference power information that is received by the first access device and sent by the first access device.

When the interference power information is the interference power information received by the terminal, that the network device acquires the interference power information includes that:

when the network device is the second access device, the second access device receives the interference power information sent by the terminal; or when the network device is the first access device or the network entity, the first access device or the network entity receives the interference power information that is received by the terminal and sent by the second receiving device.

In this embodiment, uplink detection-based processing may be further implemented according to the interference power information, which may further provide a basis for subsequent awakening or uplink cell selection.

Figure 11:
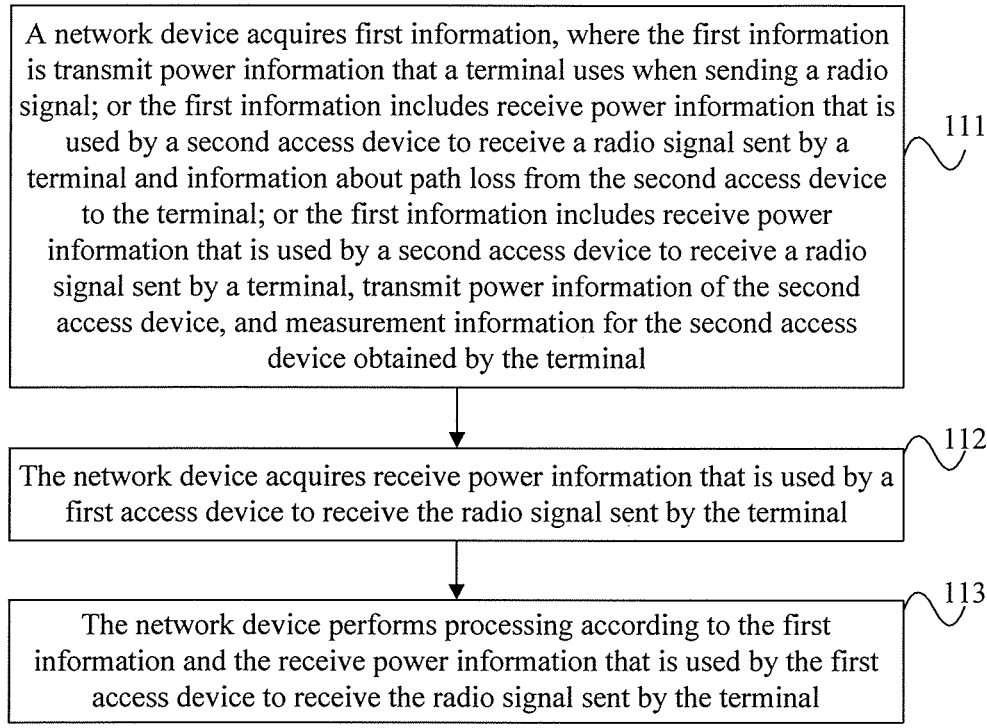
FIG. 11 is a schematic flowchart of another embodiment of an uplink detection-based processing method according to the present application.

FIG. 11 is a schematic flowchart of another embodiment of an uplink detection-based processing method according to the present application. In this embodiment, processing is not performed according to transmit power information. This embodiment includes:

Step 111. A network device acquires first information, where the first information includes receive power information that is used by a second access device to receive a radio signal sent by a terminal and information about path loss from the second access device to the terminal; or the first information includes receive power information that is used by a second access device to receive the radio signal sent by the terminal, transmit power information of the second access device, and measurement information for the second access device obtained by the terminal.

Step 112. The network device acquires receive power information that is used by the first access device to receive the radio signal sent by the terminal.

Step 113. The network device performs processing according to the first information and the receive power information that is used by the first access device to receive the radio signal sent by the terminal.

The network device is the first access device, the second access device, or a network entity, the network entity is a network device different from the first access device and the second access device, and the second access device is an access device that currently serves the terminal.

Optionally, that the network device acquires the first information includes that:

when the network device is the second access device, the second access device acquires the receive power information that is used to receive the radio signal sent by the terminal, the second access device acquires measurement information reported by the terminal, and the second access device acquires the transmit power information of the second access device. For example, the second access device may detect the radio signal sent by the terminal to obtain the receive power information that is used by the second access device to receive the radio signal sent by the terminal, the transmit power information of the second access device is information of the second access device and may also be acquired, and the measurement information may be reported to the second access device by the terminal; or the second access device acquires the receive power information that is used to receive the radio signal sent by the terminal, and the second access device acquires the information about the path loss from the second access device to the terminal. For example, the second access device may detect the radio signal sent by the terminal to obtain the receive power information that is used by the second access device to receive the radio signal sent by the terminal.

When the network device is the first access device or the network entity, the first access device or the network entity receives the first information sent by the second access device.

Optionally, the performing processing may include that:

the network device determines, according to the first information and the receive power information that is used by the first access device to receive the radio signal sent by the terminal, whether the terminal can be served by the first access device; or the network device determines, according to the first information and the receive power information that is used by the first access device to receive the radio signal sent by the terminal, to start a transmitter of the first access device; or the network device determines path loss between the terminal and the first access device according to the first information and the receive power information that is used by the first access device to receive the radio signal sent by the terminal.

Specifically, the measurement information may be reference signal receive power, and the second access device may determine, according to the reference signal receive power and transmit power that is used when a reference signal is sent, the path loss between the terminal and the second access device. When the terminal sends the radio signal, the second access device may determine the path loss between the terminal and the first access device according to the receive power information that is used by the second access device to receive the radio signal, the receive power information that is used by the first access device to receive the radio signal, and the path loss between the terminal and the second access device (which is obtained according to the measurement information or directly obtained by the second access device). For example, dB is used as a unit, $P1-P2=L1-L2$, where P1 and P2 are the receive power information that is used by the first access device to receive the radio signal and the receive power information that is used by the second access device to receive the radio signal, respectively, and L1 and L2 are the path loss between the terminal and the first access device and the path loss between the terminal and the second access device, respectively.

After the path loss between the terminal and the first access device is determined, as described in the foregoing embodiments, it may be determined, according to the path loss between the terminal and the first access device, that the first access device serves the terminal; or a transmitter of the first access device is started according to the path loss between the terminal and the first access device, and so on.

Optionally, in this embodiment, processing may also be performed according to interference power information, that is, the following may further be included:

the network device acquires the interference power information.

The performing processing may specifically include that:

the network device determines, according to the first information, the receive power information, and the interference power information, that the first access devices serves the terminal.

Optionally, when the interference power information is interference power information received by the first access device, the network device determines signal quality according to the first information, the receive power information that is used by the first access device to receive the radio signal sent by the terminal, the interference power information received by the first access device, and transmit power information, which is used when the terminal is served by the first access device, of the terminal, and determines, according to the signal quality, whether the terminal can be served by the first access device; or the network device determines the path loss between the terminal and the first access device according to the first information and the receive power information that is used by the first access device to receive the radio signal sent by the terminal; and the network device determines signal quality according to the first information, the receive power information that is used by the first access device to receive the radio signal sent by the terminal, the interference power information received by the first access device, and transmit power information, which is used when the terminal is served by the first access device, of the terminal, and determines, according to the path loss between the terminal and the first access device, and the signal quality, whether the terminal can be served by the first access device; or when the interference power information is interference power information received by the terminal, the network device determines signal quality according to the first information, the receive power information that is used by the first access device to receive the radio signal sent by the terminal, the interference power information received by the terminal, and transmit power information, which is used when the terminal is served by the first access device, of the first access device, and determines, according to the signal quality, whether the terminal can be served by the first access device; or the network device determines the path loss between the terminal and the first access device according to the first information and the receive power information that is used by the first access device to receive the radio signal sent by the terminal; and the network device determines signal quality according to the first information, the receive power information that is used by the first access device to receive the radio signal sent by the terminal, the interference power information received by the terminal, and transmit power information, which is used when the terminal is served by the first access device, of the first access device, and determines, according to the path loss between the terminal and the first access device, and the signal quality, whether the terminal can be served by the first access device. For specific content of determining the signal quality, refer to the foregoing embodiments.

In this embodiment, uplink detection-based processing can be implemented according to first information other than transmit power information, which may further provide a basis for subsequent awakening or uplink cell selection.

Figure 12:
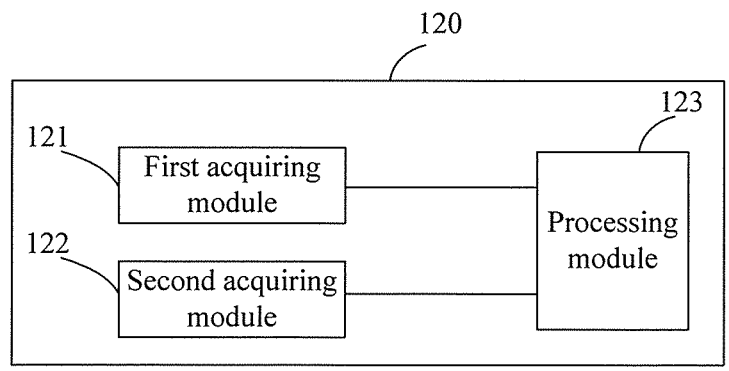
FIG. 12 is a schematic structural diagram of an embodiment of a network device according to the present application.

FIG. 12 is a schematic structural diagram of an embodiment of a network device according to the present application. The device 120 includes a first acquiring module 121, a second acquiring module 122, and a processing module 123, where the first acquiring module 121 is configured to acquire first information, where the first information is transmit power information that a terminal uses when sending a radio signal; or the first information includes receive power information that is used by a second access device to receive the radio signal sent by the terminal, and information about path loss from the second access device to the terminal; or the first information includes receive power infonation that is used by a second access device to receive the radio signal sent by the terminal, transmit power information of the second access device, and measurement information for the second access device obtained by the terminal; the second acquiring module 122 is configured to acquire receive power information that is used by the first access device to receive the radio signal sent by the terminal; and the processing module 123 is configured to perform processing according to the first information and the receive power information that is used by the first access device to receive the radio signal sent by the terminal, where the network device is the first access device, the second access device, or a network entity, the network entity is a network device different from the first access device and the second access device, and the second access device is an access device that currently serves the terminal.

Optionally, the processing module 123 is specifically configured to:

determine, according to the first information and the receive power information that is used by the first access device to receive the radio signal sent by the terminal, whether the terminal can be served by the first access device.

Optionally, the device further includes:

a third acquiring module, configured to acquire interference power information, where the interference power information is interference power information received by the first access device or interference power information that is received by the terminal and reported by the terminal, where the processing module 123 is specifically configured to determine, according to the first information, the receive power information that is used by the first access device to receive the radio signal sent by the terminal, and the interference power information, whether the terminal can be served by the first access device.

Optionally, the processing module 123 is specifically configured to:

determine path loss between the terminal and the first access device according to the first information and the receive power information that is used by the first access device to receive the radio signal sent by the terminal, and determine, according to the path loss between the terminal and the first access device, whether the terminal can be served by the first access device.

Optionally, the processing module 123 is specifically configured to:

when the interference power information is the interference power information received by the first access device, enable the network device to determine signal quality according to the first information, the receive power information that is used by the first access device to receive the radio signal sent by the terminal, the interference power information received by the first access device, and transmit power information, which is used when the terminal is served by the first access device, of the terminal, and determine, according to the signal quality, whether the terminal can be served by the first access device; or enable the network device to determine the path loss between the terminal and the first access device according to the first information and the receive power information that is used by the first access device to receive the radio signal sent by the terminal; and enable the network device to determine signal quality according to the first information, the receive power information that is used by the first access device to receive the radio signal sent by the terminal, the interference power information received by the first access device, and transmit power information, which is used when the terminal is served by the first access device, of the terminal, and determine, according to the path loss between the terminal and the first access device, and the signal quality, whether the terminal can be served by the first access device; or when the interference power information is the interference power information received by the terminal, enable the network device to determine signal quality according to the first information, the receive power information that is used by the first access device to receive the radio signal sent by the terminal, the interference power information received by the terminal, and transmit power information, which is used when the terminal is served by the first access device, of the first access device; and determine, according to the signal quality, whether the terminal can be served by the first access device; or enable the network device to determine the path loss between the terminal and the first access device according to the first information and the receive power information that is used by the first access device to receive the radio signal sent by the terminal; and enable the network device to determine signal quality according to the first information, the receive power information that is used by the first access device to receive the radio signal sent by the terminal, the interference power information received by the terminal, and transmit power information, which is used when the terminal is served by the first access device, of the first access device, and determine, according to the path loss between the terminal and the first access device, and the signal quality, whether the terminal can be served by the first access device.

Optionally, the processing module 123 is specifically configured to:

start a transmitter of the first access device according to the first information and the receive power information that is used by the first access device to receive the radio signal sent by the terminal; or determine path loss between the terminal and the first access device according to the first information and the receive power information that is used by the first access device to receive the radio signal sent by the terminal.

Optionally, the first information is the transmit power information that the terminal uses when sending the radio signal, and the first acquiring module 121 is specifically configured to:

when the network device is the second access device, receive the transmit power information that is sent by the terminal and the terminal uses when sending the radio signal; or receive the measurement information reported by the terminal, and determine, according to the transmit power information of the second access device, the receive power information that is used by the second access device to receive the radio signal sent by the terminal, and the measurement information, the transmit power information that the terminal uses when sending the radio signal; or determine the transmit power information that the terminal uses when sending the radio signal, where the transmit power information that the terminal uses when sending the radio signal is configured by the second access device for the terminal or predetermined by the second access device and the terminal; or when the network device is the first access device or the network entity, receive the first information sent by the second access device.

Optionally, the first information includes the receive power information that is used by the second access device to receive the radio signal sent by the terminal and the information about the path loss from the second access device to the terminal, or the first information includes the receive power information that is used by the second access device to receive the radio signal sent by the terminal, the transmit power information of the second access device, and the measurement information for the second access device obtained by the terminal; and the first acquiring module 121 is specifically configured to:

when the network device is the second access device, acquire the receive power information that is used by the second access device to receive the radio signal sent by the terminal, acquire the measurement information reported by the terminal, and acquire the transmit power information of the second access device; or acquire the receive power information that is used by the second access device to receive the radio signal sent by the terminal, and acquire the information about the path loss from the second access device to the terminal; and when the network device is the first access device or the network entity, receive the first information sent by the second access device.

Optionally, the first information is the transmit power information that the terminal uses when sending the radio signal, a correspondence exists between the radio signal and the transmit power information that the terminal uses when sending the radio signal, and the first acquiring module is specifically configured to:

when the network device is the first access device or the second access device, determine, according to the received radio signal, the transmit power information that the terminal uses when sending the radio signal; or when the network device is the network entity, receive the transmit power information that is determined by the first access device or the second access device and the terminal uses when sending the radio signal; or receive radio signal information sent by the first access device or the second access device, and determine, according to the correspondence and the radio signal information, the transmit power information that the terminal uses when sending the radio signal.

Optionally, the second acquiring module 122 is specifically configured to:

when the network device is the first access device, receive the radio signal or a predetermined radio signal according to characteristic information of the terminal, and acquire the receive power information that is used by the first access device to receive the radio signal sent by the terminal; or when the network device is the second access device or the network entity, receive the receive power information that is used by the first access device to receive the radio signal sent by the terminal and is sent by the first access device.

Optionally, when the interference power information is the interference power information received by the first access device, the third acquiring module is specifically configured to:

when the network device is the first access device, acquire the interference power information received by the first access device; or when the network device is the second access device or the network entity, receive the interference power information that is received by the first access device and sent by the first access device.

Optionally, when the interference power information is the interference power information received by the first access device, the processing module is specifically configured to:

determine, according to the first information, the receive power information that is used by the first access device to receive the radio signal sent by the terminal, the interference power information received by the first access device, and transmit power information, which is used when the terminal is served by the first access device, of the terminal, whether the terminal can be served by the first access device.

Optionally, when the interference power information is the interference power information received by the terminal, the third acquiring module is specifically configured to:

when the network device is the second access device, receive the interference power information that is received by the terminal and sent by the terminal; or when the network device is the first access device or the network entity, receive the interference power information that is received by the terminal and sent by the second receiving device.

Optionally, when the interference power information is the interference power information received by the terminal, the processing module is specifically configured to:

determine, according to the first information, the receive power information that is used by the first access device to receive the radio signal sent by the terminal, the interference power information received by the terminal, and transmit power information, which is used when the terminal is served by the first access device, of the first access device, whether the terminal can be served by the first access device.

Optionally, the radio signal is sent by the terminal according to characteristic information, where the characteristic information includes at least one of the following:

a cell identity;

a terminal identifier; and a configuration message that is configured by the second access device for the terminal to send the radio signal.

Optionally, the configuration message that is configured by the second access device for the terminal to send the radio signal includes at least one of the following:

time domain resource information, frequency domain resource information, code domain resource information, and space domain resource information.

In this embodiment, first information may be acquired, then uplink detection-based processing may be implemented according to the first information and receive power information that a first access device uses when receiving a radio signal, and further it may be determined, according to a processing result, whether a terminal falls within coverage of a low-power base station, or path loss is determined and a transmitter is started, and so on.

Figure 13:
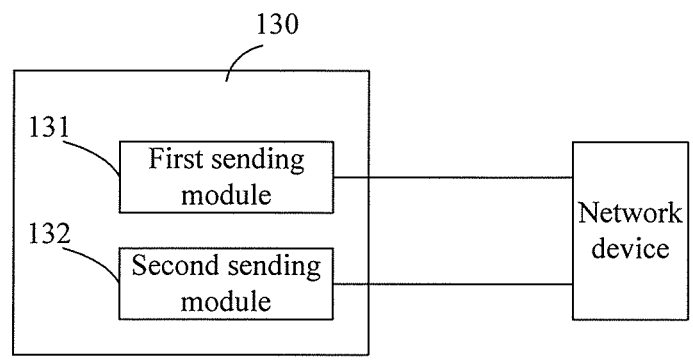
FIG. 13 is a schematic structural diagram of an embodiment of a terminal according to the present application.

FIG. 13 is a schematic structural diagram of an embodiment of a terminal according to the present application. The terminal 130 includes a first sending module 131 or a second sending module 132, where the first sending module 131 is configured to send a radio signal, and report second information to a second access device, where the radio signal enables a first access device to acquire receive power information that is used by the first access device to receive the radio signal sent by the terminal, and the second information is transmit power information that the terminal uses when sending the radio signal or the second information is measurement information for the second access device obtained by the terminal, so as to enable a network device to: when the second information is the transmit power information that the terminal uses when sending the radio signal, perform processing according to the transmit power information that the terminal uses when sending the radio signal and the receive power information that is used by the first access device to receive the radio signal sent by the terminal; or when the second information is the measurement information for the second access device obtained by the terminal, perform processing according to receive power information that is used by the second access device to receive the radio signal sent by the terminal, transmit power information of the second access device, the measurement information for the second access device obtained by the terminal, and the receive power information that is used by the first access device to receive the radio signal sent by the terminal; or the second sending module 132 is configured to send a radio signal, where the radio signal enables a first access device to acquire receive power information that is used by the first access device to receive the radio signal sent by the terminal, and enables a second access device to acquire receive power information that is used by the second access device to receive the radio signal sent by the terminal, so as to enable a network device to perform processing according to the receive power information that is used by the first access device to receive the radio signal sent by the terminal, the receive power information that is used by the second access device to receive the radio signal sent by the terminal, and information about path loss from the second access device to the terminal, where the network device is the first access device, the second access device, or a network entity, the network entity is a network device different from the first access device and the second access device, and the second access device is an access device that currently serves the terminal.

Optionally, the device further includes:

a third sending module, configured to report, to the second access device, interference power information received by the terminal, so as to enable the network device to: when the second information is the transmit power information that the terminal uses when sending the radio signal, determine, according to the transmit power information that the terminal uses when sending the radio signal, the receive power information that is used by the first access device to receive the radio signal sent by the terminal, the interference power information received by the terminal, and transmit power information, which is used when the terminal is served by the first access device, of the first access device, whether the terminal can be served by the first access device; or enable the network device to: when the second information is the measurement information for the second access device obtained by the terminal, determine, according to the receive power information that is used by the second access device to receive the radio signal sent by the terminal, the transmit power information of the second access device, the measurement information for the second access device obtained by the terminal, the receive power information that is used by the first access device to receive the radio signal sent by the terminal, the interference power information received by the terminal, and transmit power information, which is used when the terminal is served by the first access device, of the first access device, whether the terminal can be served by the first access device; or enable the network device to determine, according to the receive power information that is used by the first access device to receive the radio signal sent by the terminal, the receive power information that is used by the second access device to receive the radio signal sent by the terminal, the information about the path loss from the second access device to the terminal, the interference power information received by the terminal, and transmit power information, which is used when the terminal is served by the first access device, of the first access device, whether the terminal can be served by the first access device.

Optionally, the first sending module 131 is specifically configured to:

send, according to transmit power information configured by the second access device, the radio signal by using the configured transmit power information; or send, according to a correspondence between a radio signal and transmit power information, the radio signal by using transmit power information corresponding to the radio signal; or send, according to transmit power information predetermined by the second access device and the terminal, the radio signal by using the predetermined transmit power information.

Optionally, the first sending module 131 is specifically configured to:

send, according to characteristic information configured by the second access device, the radio signal by using the configured characteristic information; or send, according to a radio signal predetermined by the second access device and the terminal, the predetermined radio signal.

In this embodiment, first information may be acquired, then uplink detection-based processing may be implemented according to the first information and receive power information that a first access device uses when receiving a radio signal, and further it may be determined, according to a processing result, whether a terminal falls within coverage of a low-power base station, or path loss is determined and a transmitter is started, and so on.

Figure 14:
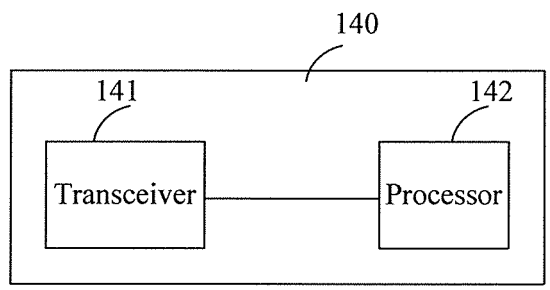
FIG. 14 is a schematic structural diagram of another embodiment of a network device according to the present application.

FIG. 14 is a schematic structural diagram of another embodiment of a network device according to the present application. The device 140 includes a transceiver 141 and a processor 142, where the transceiver 141 is configured to acquire first information, where the first information is transmit power information that a terminal uses when sending a radio signal; or the first information includes receive power information that is used by a second access device to receive the radio signal sent by the terminal, and information about path loss from the second access device to the terminal; or the first information includes receive power information that is used by a second access device to receive the radio signal sent by the terminal, transmit power information of the second access device, and measurement information for the second access device obtained by the terminal; and acquire receive power information that is used by the first access device to receive the radio signal sent by the terminal; and the processor 142 is configured to perform processing according to the first information and the receive power information that is used by the first access device to receive the radio signal sent by the terminal, where the network device is the first access device, the second access device, or a network entity, the network entity is a network device different from the first access device and the second access device, and the second access device is an access device that currently serves the terminal.

Optionally, the processor 142 is specifically configured to determine, according to the first information and the receive power information that is used by the first access device to receive the radio signal sent by the terminal, whether the terminal can be served by the first access device.

Optionally, the transceiver 141 is further configured to acquire interference power information, where the interference power information is interference power information received by the first access device or interference power information that is received by the terminal and reported by the terminal; and the processor is specifically configured to determine, according to the first information, the receive power information that is used by the first access device to receive the radio signal sent by the terminal, and the interference power information, whether the terminal can be served by the first access device.

Optionally, the processor 142 is specifically configured to determine path loss between the terminal and the first access device according to the first information and the receive power information that is used by the first access device to receive the radio signal sent by the terminal, and determine, according to the path loss between the terminal and the first access device, whether the terminal can be served by the first access device.

Optionally, the processor 142 is specifically configured to: when the interference power information is the interference power information received by the first access device, enable the network device to determine signal quality according to the first information, the receive power information that is used by the first access device to receive the radio signal sent by the terminal, the interference power information received by the first access device, and transmit power information, which is used when the terminal is served by the first access device, of the terminal, and determine, according to the signal quality, whether the terminal can be served by the first access device; or enable the network device to determine path loss between the terminal and the first access device according to the first information and the receive power information that is used by the first access device to receive the radio signal sent by the terminal; enable the network device to determine signal quality according to the first information, the receive power information that is used by the first access device to receive the radio signal sent by the terminal, the interference power information received by the first access device, and transmit power information, which is used when the terminal is served by the first access device, of the terminal, and determine, according to the path loss between the terminal and the first access device, and the signal quality, whether the terminal can be served by the first access device; or when the interference power information is the interference power information received by the terminal, enable the network device to determine signal quality according to the first information, the receive power information that is used by the first access device to receive the radio signal sent by the terminal, the interference power information received by the terminal, and transmit power information, which is used when the terminal is served by the first access device, of the first access device, and determine, according to the signal quality, whether the terminal can be served by the first access device; or enable the network device to determine path loss between the terminal and the first access device according to the first information and the receive power information that is used by the first access device to receive the radio signal sent by the terminal; enable the network device to determine signal quality according to the first information, the receive power information that is used by the first access device to receive the radio signal sent by the terminal, the interference power information received by the terminal, and transmit power information, which is used when the terminal is served by the first access device, of the first access device; and determine, according to the path loss between the terminal and the first access device, and the signal quality, whether the terminal can be served by the first access device.

Optionally, the processor 142 is specifically configured to start a transmitter of the first access device according to the first information and the receive power information that is used by the first access device to receive the radio signal sent by the terminal; or determine path loss between the terminal and the first access device according to the first information and the receive power information that is used by the first access device to receive the radio signal sent by the terminal.

Optionally, the transceiver 141 is specifically configured to: when the network device is the second access device, receive the transmit power information that is sent by the terminal and the terminal uses when sending the radio signal; or receive the measurement information reported by the terminal, and determine, according to the transmit power information of the second access device, the receive power information that is used by the second access device to receive the radio signal sent by the terminal, and the measurement information, the transmit power information that the terminal uses when sending the radio signal; or determine the transmit power information that the terminal uses when sending the radio signal, where the transmit power information that the terminal uses when sending the radio signal is configured by the second access device for the terminal or predetermined by the second access device and the terminal; or when the network device is the first access device or the network entity, receive the first information sent by the second access device.

Optionally, the transceiver 141 is specifically configured to: when the network device is the second access device, acquire the receive power information that is used by the second access device to receive the radio signal sent by the terminal, acquire the measurement information reported by the terminal, and acquire the transmit power information of the second access device; or acquire the receive power information that is used by the second access device to receive the radio signal sent by the terminal, and acquire the information about the path loss from the second access device to the terminal; and when the network device is the first access device or the network entity, receive the first information sent by the second access device.

Optionally, the processor 142 is specifically configured to: when the network device is the first access device or the second access device, determine, according to the received radio signal, the transmit power information that the terminal uses when sending the radio signal; or when the network device is the network entity, receive the determined transmit power information that the terminal uses when sending the radio signal; or receive radio signal information sent by the first access device or the second access device, and determine, according to the correspondence and the radio signal information, the transmit power information that the terminal uses when sending the radio signal.

Optionally, the transceiver 141 is specifically configured to: when the network device is the first access device, receive the radio signal or a predetermined radio signal according to characteristic information of the terminal, and acquire the receive power information that is used by the first access device to receive the radio signal sent by the terminal; or when the network device is the second access device or the network entity, receive the receive power information that is used by the first access device to receive the radio signal sent by the terminal and is sent by the first access device.

Optionally, when the interference power information is the interference power information received by the first access device, the transceiver is specifically configured to: when the network device is the first access device, acquire the interference power information received by the first access device; or when the network device is the second access device or the network entity, receive the interference power information that is received by the first access device and sent by the first access device.

Optionally, when the interference power information is the interference power information received by the first access device, the processor is specifically configured to determine, according to the first information, the receive power information that is used by the first access device to receive the radio signal sent by the terminal, the interference power information received by the first access device, and transmit power information, which is used when the terminal is served by the first access device, of the terminal, whether the terminal can be served by the first access device.

Optionally, when the interference power information is the interference power information received by the terminal, the transceiver is specifically configured to: when the network device is the second access device, receive the interference power information that is received by the terminal and sent by the terminal; or when the network device is the first access device or the network entity, receive the interference power information that is received by the terminal and sent by the second receiving device.

Optionally, when the interference power information is the interference power information received by the terminal, the processor is specifically configured to determine, according to the first information, the receive power information that is used by the first access device to receive the radio signal sent by the terminal, the interference power information received by the terminal, and transmit power information, which is used when the terminal is served by the first access device, of the first access device, whether the terminal can be served by the first access device.

Optionally, the radio signal is sent by the terminal according to characteristic information, where the characteristic information includes at least one of the following: a cell identity; a terminal identifier; and a configuration message that is configured by the second access device for the terminal to send the radio signal.

Optionally, the configuration message that is configured by the second access device for the terminal to send the radio signal includes at least one of the following: time domain resource information, frequency domain resource information, code domain resource information, and space domain resource information.

In this embodiment, first information may be acquired, then uplink detection-based processing may be implemented according to the first information and receive power information that a first access device uses when receiving a radio signal, and further it may be determined, according to a processing result, whether a terminal falls within coverage of a low-power base station, or path loss is determined and a transmitter is started, and so on.

Figure 15:
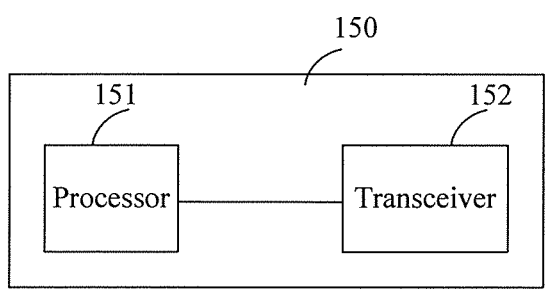
FIG. 15 is a schematic structural diagram of another embodiment of a terminal according to the present application.

FIG. 15 is a schematic structural diagram of an embodiment of a terminal according to the present application. The terminal 150 includes a processor 151 and a transceiver 152, where the processor 151 is configured to generate a radio signal or generate a radio signal and second information; the transceiver 152 is configured to send the radio signal, and report the second information to a second access device, where the radio signal enables a first access device to acquire receive power information that is used by the first access device to receive the radio signal sent by the terminal, and the second information is transmit power information that the terminal uses when sending the radio signal or the second information is measurement information for the second access device obtained by the terminal, so as to enable a network device to: when the second information is the transmit power information that the terminal uses when sending the radio signal, perform processing according to the transmit power information that the terminal uses when sending the radio signal and the receive power information that is used by the first access device to receive the radio signal sent by the terminal; or when the second information is the measurement information for the second access device obtained by the terminal, perform processing according to receive power information that is used by the second access device to receive the radio signal sent by the terminal, transmit power information of the second access device, the measurement information for the second access device obtained by the terminal, and the receive power information that is used by the first access device to receive the radio signal sent by the terminal; or the transceiver 152 is configured to send the radio signal, where the radio signal enables a first access device to acquire receive power information that is used by the first access device to receive the radio signal sent by the terminal, and enables a second access device to acquire receive power information that is used by the second access device to receive the radio signal sent by the terminal, so as to enable a network device to perform processing according to the receive power information that is used by the first access device to receive the radio signal sent by the terminal, the receive power information that is used by the second access device to receive the radio signal sent by the terminal, and information about path loss from the second access device to the terminal, where the network device is the first access device, the second access device, or a network entity, the network entity is a network device different from the first access device and the second access device, and the second access device is an access device that currently serves the terminal.

Optionally, the transceiver 152 is further configured to report, to the second access device, interference power information received by the terminal, so as to enable the network device to: when the second information is the transmit power information that the terminal uses when sending the radio signal, determine, according to the transmit power information that the terminal uses when sending the radio signal, the receive power information that is used by the first access device to receive the radio signal sent by the terminal, the interference power information received by the terminal, and transmit power information, which is used when the terminal is served by the first access device, of the first access device, whether the terminal can be served by the first access device; or enable the network device to: when the second information is the measurement information for the second access device obtained by the terminal, determine, according to the receive power information that is used by the second access device to receive the radio signal sent by the terminal, the transmit power information of the second access device, the measurement information for the second access device obtained by the terminal, the receive power information that is used by the first access device to receive the radio signal sent by the terminal, the interference power information received by the terminal, and transmit power information, which is used when the terminal is served by the first access device, of the first access device, whether the terminal can be served by the first access device; or enable the network device to determine, according to the receive power information that is used by the first access device to receive the radio signal sent by the terminal, the receive power information that is used by the second access device to receive the radio signal sent by the terminal, the information about the path loss from the second access device to the terminal, the interference power information received by the terminal, and transmit power information, which is used when the terminal is served by the first access device, of the first access device, whether the terminal can be served by the first access device.

Optionally, the transceiver 152 is specifically configured to send, according to transmit power information configured by the second access device, the radio signal by using the configured transmit power information; or send, according to a correspondence between a radio signal and transmit power information, the radio signal by using transmit power information corresponding to the radio signal; or send, according to transmit power information predetermined by the second access device and the terminal, the radio signal by using the predetermined transmit power information.

Optionally, the transceiver 152 is specifically configured to send, according to characteristic information configured by the second access device, the radio signal by using the configured characteristic information; or send, according to a radio signal predetermined by the second access device and the terminal, the predetermined radio signal.

In this embodiment, first information may be acquired, then uplink detection-based processing may be implemented according to the first information and receive power information that a first access device uses when receiving a radio signal, and further it may be determined, according to a processing result, whether a terminal falls within coverage of a low-power base station, or path loss is determined and a transmitter is started, and so on.

The transceiver may be a stand-alone sender and a stand-alone receiver that execute a sending function and a receiving function respectively, or may be a device that has both a sending function and a receiving function. Specifically, the transceiver may be implemented by using a network cable, an optical fiber, or an antenna, where the antenna may be a linear antenna, a loop antenna, an array antenna, or the like.

The processor may be a universal processor, a digital signal processor (DSP), an application-specific integrated circuit (ASIC), a field programmable gate array (FPGA) or another programmable logical device, a discrete gate or a transistor logic device, or a discrete hardware component. The universal processor may be a microprocessor or any conventional processor.

In addition, the device may further include a memory, where the memory may be a storage medium that is mature in the art, such as a random access memory, a flash memory, a read-only memory, a programmable read-only memory, an electrically erasable programmable memory, or a register. In addition, the device may further include a bus system, where the bus system includes, for example, a data bus, a power supply bus, a control bus, or a status signal bus.

It may be clearly understood by a person skilled in the art that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. An uplink detection-based processing method, comprising:
    receiving, by a network device, first information corresponding to a terminal that is different from the network device and currently served by a first access device, the first information comprising:
        first transmit power information that the terminal uses when sending a radio signal;
        first receive power information that is used by the first access device to receive the radio signal sent by the terminal and path loss information corresponding to a first path loss between the first access device and the terminal; or
        the first receive power information, second transmit power information that the first access device uses when sending another radio signal, and measurement information obtained by the terminal corresponding to receiving the another radio signal sent by the first access device;
    receiving, by the network device, second receive power information that is used by a second access device to receive the radio signal sent by the terminal;
    determining, by the network device, whether the second access device is available to serve the terminal according to the first information and the second receive power information that is used by the second access device to receive the radio signal sent by the terminal; and
    selecting the second access device to serve the terminal after the network device determines that the second access device is available to serve the terminal,
    wherein the method further comprises receiving, by the network device, first interference power information from the first access device or second interference power information from the terminal,
    wherein determining whether the second access device is available to serve the terminal is further based on the first interference power information or the second interference power information, comprising:
        determining, by the network device, signal quality according to the first information, the second receive power information, third transmit power information that the terminal uses when the terminal is served by the second access device, and at least one of the first interference power information from the first access device or the second interference power information from the terminal; and
        determining whether the second access device is available to serve the terminal according to the signal quality.

2. The method according to claim 1, wherein determining whether the second access device is available to serve the terminal comprises determining whether the terminal is within coverage of the second access device based on the first information and the second receive power information.

3. The method according to claim 1, wherein determining whether the second access device is available to serve the terminal comprises:
    determining, by the network device, a second path loss between the terminal and the second access device according to the first information and the second receive power information; and determining that the second access device is available to serve the terminal when the second path loss between the terminal and the second access device is less than a predetermined threshold.

4. The method according to claim 1, wherein the radio signal is sent by the terminal according to characteristic information, wherein the characteristic information comprises at least one of the following:
   a cell identity;
   a terminal identifier; or
   a configuration message configured by the first access device for the terminal to send the radio signal.

5. The method according to claim 4, wherein the configuration message configured by the first access device for the terminal to send the radio signal comprises at least one of the following:
   time domain resource information, frequency domain resource information, code domain resource information, or space domain resource information.

6. The method according to claim 1, wherein selecting the second access device to serve the terminal comprises starting, by the network device, a transmitter of the second access device.

7. The method according to claim 1, wherein the first access device is a macro base station, and the second access device is a low-power base station.

8. An uplink detection-based processing method, comprising:
   sending, by a terminal that is currently served by a first access device, a radio signal;
   reporting, by the terminal, second information to the first access device, wherein the second information comprises:
      transmit power information that the terminal uses when sending the radio signal; or
      measurement information obtained by the terminal for receiving another radio signal sent by the first access device;
   receiving, by a network device, the second information or characteristic information of the first access device from the first access device;
   receiving, by the network device, receive power information from a second access device that is used by the second access device to receive the radio signal sent by the terminal;
   determining, by the network device, whether the second access device is available to serve the terminal according to the receive power information and at least one of the second information and the characteristic information of the first access device; and
   selecting the second access device to serve the terminal after the network device determines that the second access device is available to serve the terminal,
   wherein the method further comprises receiving, by the network device, first interference power information from the first access device or second interference power information from the terminal,
   wherein determining whether the second access device is available to serve the terminal is further based on the first interference power information or the second interference power information, comprising:
      determining, by the network device, signal quality according to the second information, the receive power information, second transmit power information that the terminal uses when the terminal is served by the second access device, and at least one of the first interference power information from the first access device or the second interference power information from the terminal; and
      determining whether the second access device is available to serve the terminal according to the signal quality.

9. The method according to claim 8, further comprising:
   reporting, by the terminal to the first access device, interference power information received by the terminal; and
   receiving, by the network device, the interference information from the first access device,
   wherein determining whether the second access device is available to serve the terminal is further based on the interference power information.

10. The method according to claim 8, wherein sending, by the terminal, the radio signal comprises sending the radio signal at a transmit power determined based on:
    the transmit power information configured by the first access device;
    a correspondence between the radio signal and the transmit power information; or
    the transmit power information predetermined by the first access device and the terminal.

11. The method according to claim 8, wherein sending, by the terminal, the radio signal comprises sending the radio signal according to:
    characteristic information configured by the first access device; or
    a radio signal predetermined by the first access device and the terminal.

12. A network device, comprising:
    a transceiver, configured to:
       receive first information corresponding to a terminal that is different from the network device and currently served by a first access device, wherein the first information comprises:
          first transmit power information that the terminal uses when sending a radio signal;
          first receive power information that is used by the first access device to receive the radio signal sent by the terminal and path loss information corresponding to a first path loss between the first access device and the terminal; or
          the first receive power information, second transmit power information that the first access device uses when sending another radio signal, and measurement information obtained by the terminal corresponding to receiving the another radio signal sent by the first access device; and
       receive second receive power information that is used by a second access device to receive the radio signal sent by the terminal; and
    a processor, configured to:
       determine whether the second access device is available to serve the terminal according to the first information and the second receive power information that is used by the second access device to receive the radio signal sent by the terminal; and
       select the second access device to serve the terminal after the processor determines that the second access device is available to serve the terminal,
    wherein the transceiver is further configured to receive first interference power information from the first access device or second interference power information from the terminal,
    wherein the processor is configured to determine whether the second access device is available to serve the terminal further based on the first interference power information or the second interference power information, comprising:
- determining signal quality according to the first information, the second receive power information, third transmit power information that the terminal uses when the terminal is served by the second access device, and at least one of the first interference power information from the first access device or the second interference power information from the terminal; and
- determining whether the second access device is available to serve the terminal according to the signal quality.

13. The device according to claim 12, wherein the processor is configured to determine whether the terminal is within coverage of the second access device based on the first information and the second receive power information.

14. The device according to claim 12, wherein the processor is configured to:
- determine a second path loss between the terminal and the second access device according to the first information and the second receive power information; and
- determine that the second access device is available to serve the terminal when the second path loss between the terminal and the second access device is less than a predetermined threshold.

15. The device according to claim 12, wherein the radio signal is sent by the terminal according to characteristic information, and the characteristic information comprises at least one of the following:
- a cell identity;
- a terminal identifier; and
- a configuration message configured by the first access device for the terminal to send the radio signal.

16. The device according to claim 15, wherein the configuration message configured by the first access device for the terminal to send the radio signal comprises at least one of the following:
- time domain resource information, frequency domain resource information, code domain resource information, and space domain resource information.

* * * * *